US011045058B2

(12) United States Patent
Hwang et al.

(10) Patent No.: US 11,045,058 B2
(45) Date of Patent: Jun. 29, 2021

(54) CLEANER

(71) Applicant: LG ELECTRONICS INC., Seoul (KR)

(72) Inventors: Philjae Hwang, Seoul (KR); Mantae Hwang, Seoul (KR); Jungbae Hwang, Seoul (KR); Eunji Sung, Seoul (KR); Taekgi Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 656 days.

(21) Appl. No.: 15/657,551

(22) Filed: Jul. 24, 2017

(65) Prior Publication Data

US 2018/0055324 A1 Mar. 1, 2018

(30) Foreign Application Priority Data

Aug. 25, 2016 (KR) .................. 10-2016-0108317
Dec. 30, 2016 (KR) .................. 10-2016-0183825

(51) Int. Cl.
*A47L 9/28* (2006.01)
*H01M 50/10* (2021.01)
*H01M 50/50* (2021.01)
*A47L 9/32* (2006.01)
*A47L 5/24* (2006.01)
*H01M 50/20* (2021.01)
(Continued)

(52) U.S. Cl.
CPC ............... *A47L 9/2884* (2013.01); *A47L 5/24* (2013.01); *A47L 9/322* (2013.01); *H01M 10/0436* (2013.01); *H01M 50/10* (2021.01); *H01M 50/20* (2021.01); *H01M 50/213* (2021.01); *H01M 50/50* (2021.01)

(58) Field of Classification Search
CPC .......... A47L 9/2884; A47L 9/322; A47L 5/24; H01M 2/0202; H01M 2/1022; H01M 2/1055; H01M 2/20; H01M 10/0436; H01M 2/202; H01M 50/50; H01M 50/10; H01M 50/213; H01M 50/20; H01R 13/133
See application file for complete search history.

(56) References Cited

U.S. PATENT DOCUMENTS 9,112,292 B2   8/2015  Ogura
9,711,986 B2   7/2017  Sunderland et al.
(Continued)

FOREIGN PATENT DOCUMENTS

EP      2811886       12/2014
JP      07-030950    6/1995
(Continued)

OTHER PUBLICATIONS

English translation of JP-2008166148-A (Year: 2008).*
(Continued)

*Primary Examiner* — Magali P Slawski
*Assistant Examiner* — Kimberly Wyluda
(74) *Attorney, Agent, or Firm* — Fish & Richardson P.C.

(57) ABSTRACT

A cleaner includes: a battery housing: a main body terminal that is disposed in the battery housing; and a battery that is separably coupled to the battery housing, wherein the battery includes: a plurality of battery cells; a battery management unit to manage voltage of the battery cells; and a battery terminal that is connected to the battery management unit and is connected to the main body terminal when the battery is inserted into the battery housing.

20 Claims, 27 Drawing Sheets

(51) Int. Cl.
H01M 50/213 (2021.01)
H01M 10/04 (2006.01)

(56) References Cited

U.S. PATENT DOCUMENTS

| | | |
|---|---|---|
| 2005/0014423 A1 | 1/2005 | Roepke |
| 2005/0155177 A1 | 7/2005 | Baer et al. |
| 2010/0192314 A1* | 8/2010 | Otsuka .................. A47L 9/2884 15/3 |
| 2013/0207615 A1 | 8/2013 | Sunderland et al. |
| 2013/0244504 A1 | 9/2013 | Ogura et al. |
| 2015/0014423 A1 | 1/2015 | Yang |

FOREIGN PATENT DOCUMENTS

| | | |
|---|---|---|
| JP | 2003-077437 | 3/2003 |
| JP | 2008166148 A * | 7/2008 |
| JP | 2013-196816 | 9/2013 |
| JP | 2013-196816 A | 9/2013 |
| JP | 2014-176567 | 9/2014 |
| JP | 2015084809 | 5/2015 |
| KR | 10-1127088 | 4/2009 |
| KR | 10-2014-0127305 | 11/2014 |

OTHER PUBLICATIONS

Extended European Search Report in European Application No. 17843789.3, dated May 22, 2019, 8 pages.
EP Office Action in European Appln. No. 17843789.3, dated Nov. 20, 2020, 4 pages.
Australian Examination Report in AU Appln. No. 2020200415, dated Mar. 10, 2021, 5 pages.

* cited by examiner

CLEANER

CROSS-REFERENCE TO RELATED APPLICATIONS

This application claims priority under 35 U.S.C. § 119 to Korean Patent Application No. 10-2016-0108317, filed in Korea on Aug. 25, 2016, and Korean Patent Application No. 10-2016-0183825, filed in Korea on Dec. 30, 2016, whose entire disclosure is hereby incorporated by reference.

BACKGROUND

The present disclosure relates to a cleaner.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

Meanwhile, in the related art, a handheld vacuum cleaner has been disclosed in Korean Patent No. 10-1127088 (registered on 8 Mar. 2012).

The handheld vacuum cleaner includes a suction pipe, an airflow generator, a cyclone, a power supply, and a handle.

The cyclone is disposed between the handle and the suction pipe, the airflow generator is disposed right over the handle, and the power supply is disposed right under the handle. Accordingly, the airflow generator and the power supply are disposed behind the cyclone.

The power supply includes a plurality of battery cells laid in parallel. There is a problem in the prior art document in that it is required to disassemble the cleaner in order to separate the power supply from the cleaner.

Further, since the battery cells are laid in parallel on one layer, there is a problem in that the volume occupied by the power supply is large and the maximum voltage that the power supply can supply to a suction motor is small.

SUMMARY

The present disclosure provides a cleaner that allows a battery to be easily mounted and separated.

The present disclosure provides a cleaner in which contact between a battery terminal and a main body terminal can be stably maintained even if the battery is frequently mounted and separated.

The present disclosure provides a cleaner in which deformation of a circuit board on which a battery terminal is mounted is prevented when a battery is mounted and separated.

A cleaner includes: a battery housing: a main terminal that is disposed in the battery housing; and a battery that is separably coupled to the battery housing, wherein the battery includes: a plurality of battery cells; a battery management unit to manage voltage of the plurality of battery cells; and a battery terminal that is connected to the battery management unit and is connected to the main body terminal when the battery is inserted into the battery housing, wherein the battery terminal includes: a first clip terminal that is elastically deformable and has a first contact portion; and a second clip terminal that is elastically deformable and has a second contact portion, the main body terminal is in contact with the first contact portion and the second contact portion between the first contact portion and the second contact portion, and the first contact portion and the second contact portion are spaced apart from each other in parallel with a coupling direction of the battery terminal and the main body terminal.

A cleaner includes: a battery housing: a main body terminal that is disposed in the battery housing; and a battery that is separably coupled to the battery housing, wherein the battery includes: a plurality of battery cells; a battery management unit to manage voltage of the battery cells; and a battery terminal that is connected to the battery management unit and is connected to the main body terminal when the battery is inserted into the battery housing, wherein the battery terminal includes a first clip terminal having a first contact portion and a second contact portion spaced apart from each other in a second direction crossing a first direction in which the battery is inserted into the battery housing; and a second clip terminal having a third contact portion and a fourth contact portion spaced apart from each other in the second direction crossing the first direction, the first contact portion and the second contact portion are spaced apart from each other in a third direction that is the arrangement direction of the first clip terminal and the second clip terminal, and the third contact portion and the fourth contact portions are spaced apart from each other in the third direction.

DETAILED DESCRIPTION OF THE EMBODIMENTS

Figure 1:
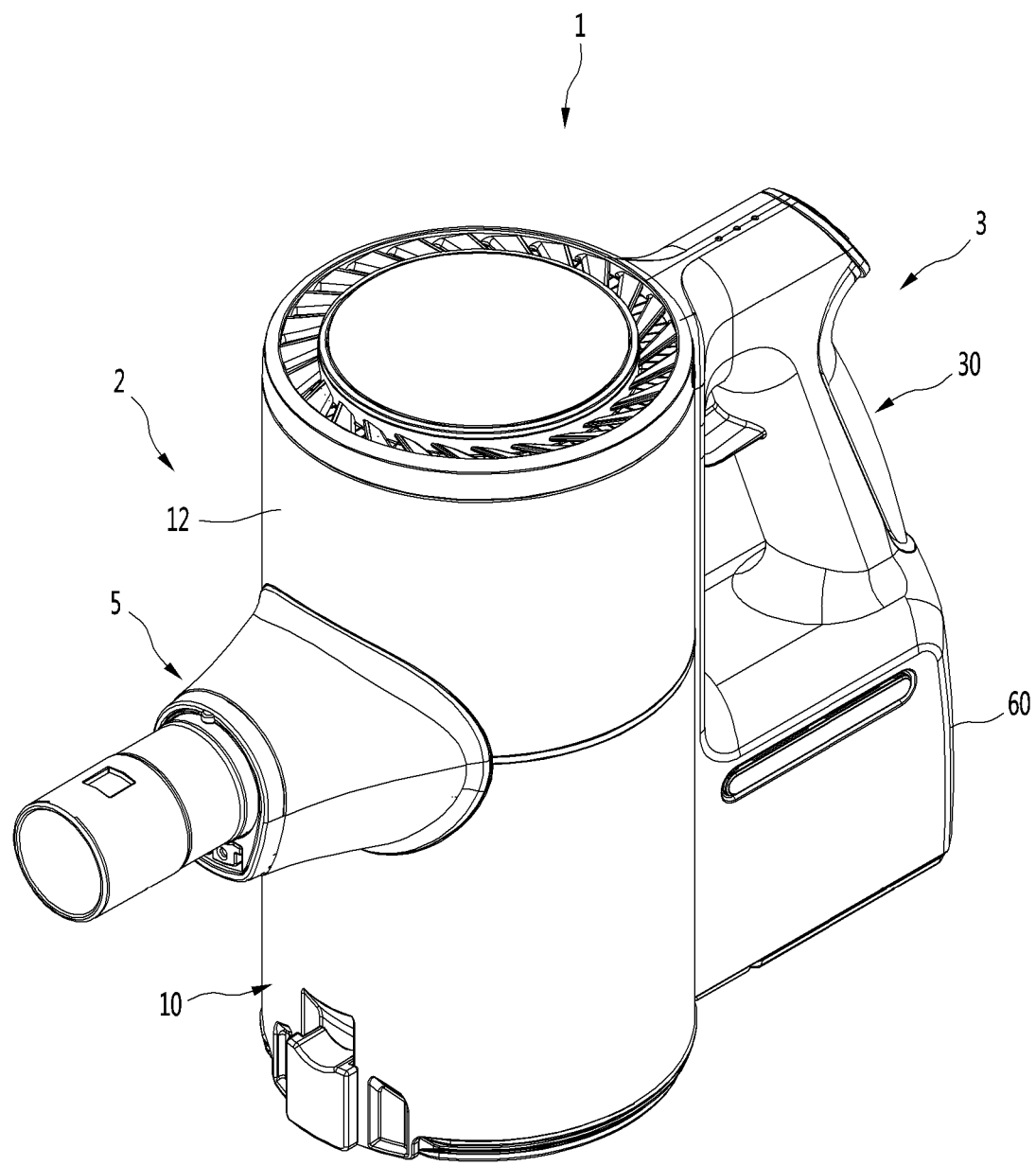
FIG. 1 is a perspective view of a cleaner according to an embodiment of the present invention.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
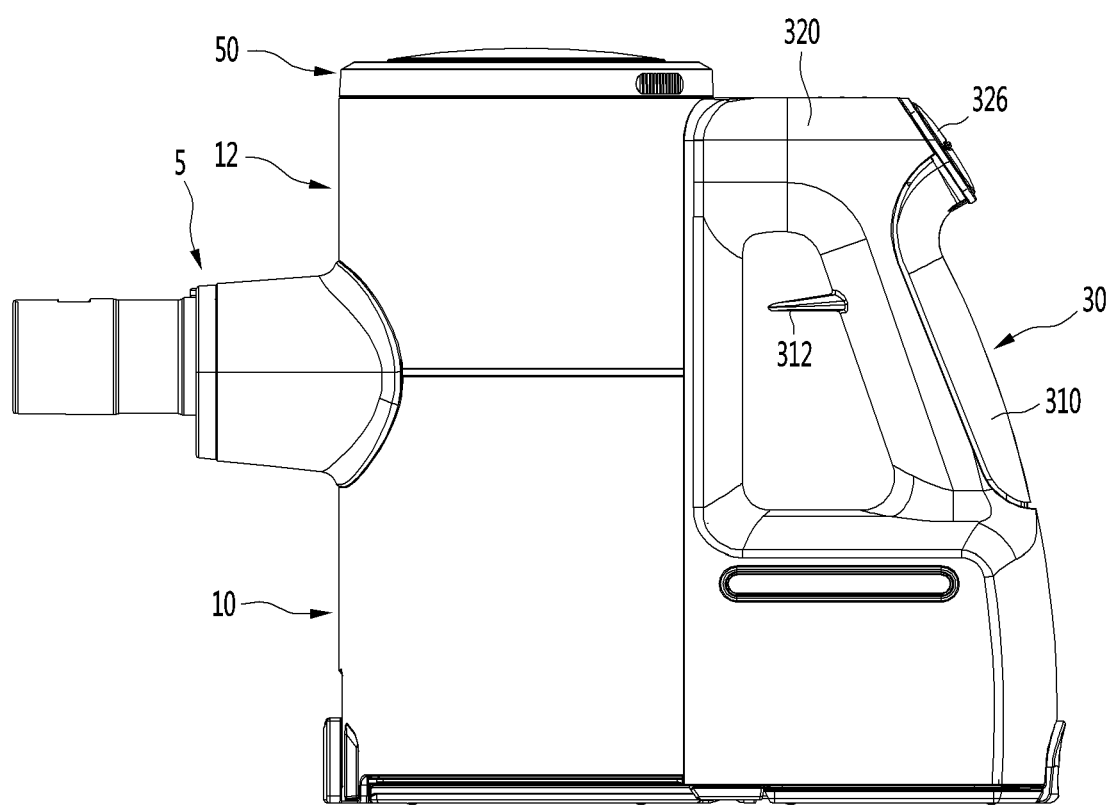
FIG. 2 is a side view of the cleaner according to an embodiment of the present invention.
Figure 3:
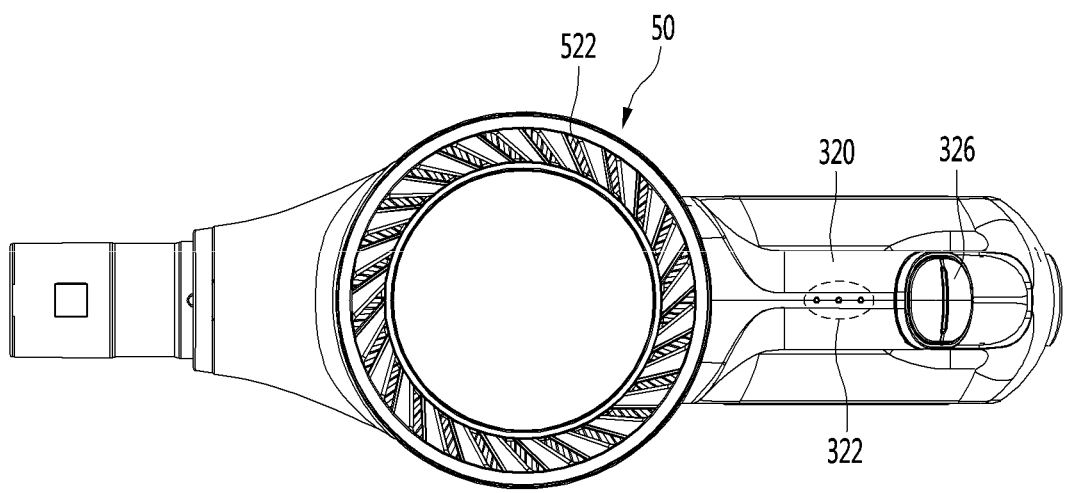
FIG. 3 is a plan view of the cleaner according to an embodiment of the present invention.
Figure 4:
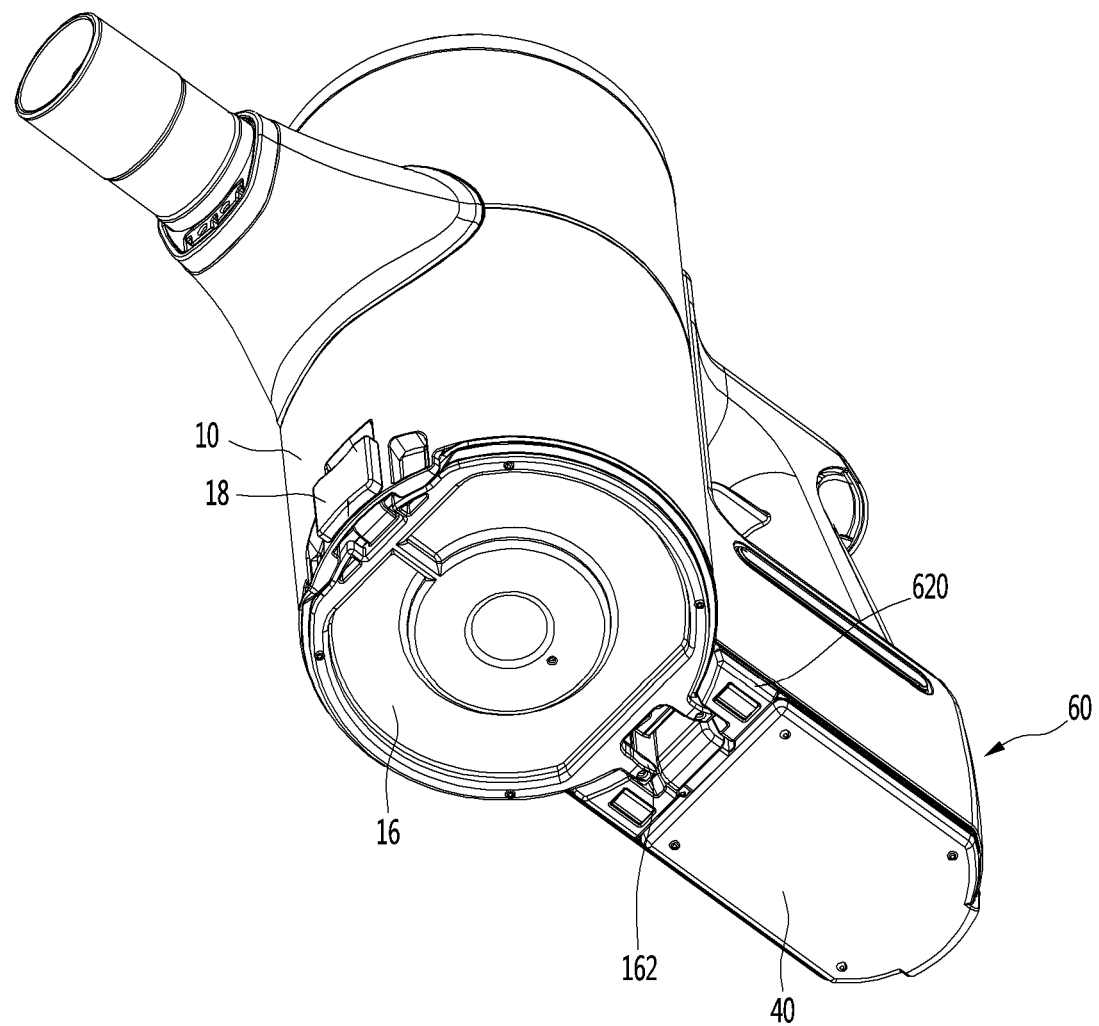
FIG. 4 is a perspective view of the cleaner according to an embodiment of the present invention when seen from under the cleaner.
Figure 5:
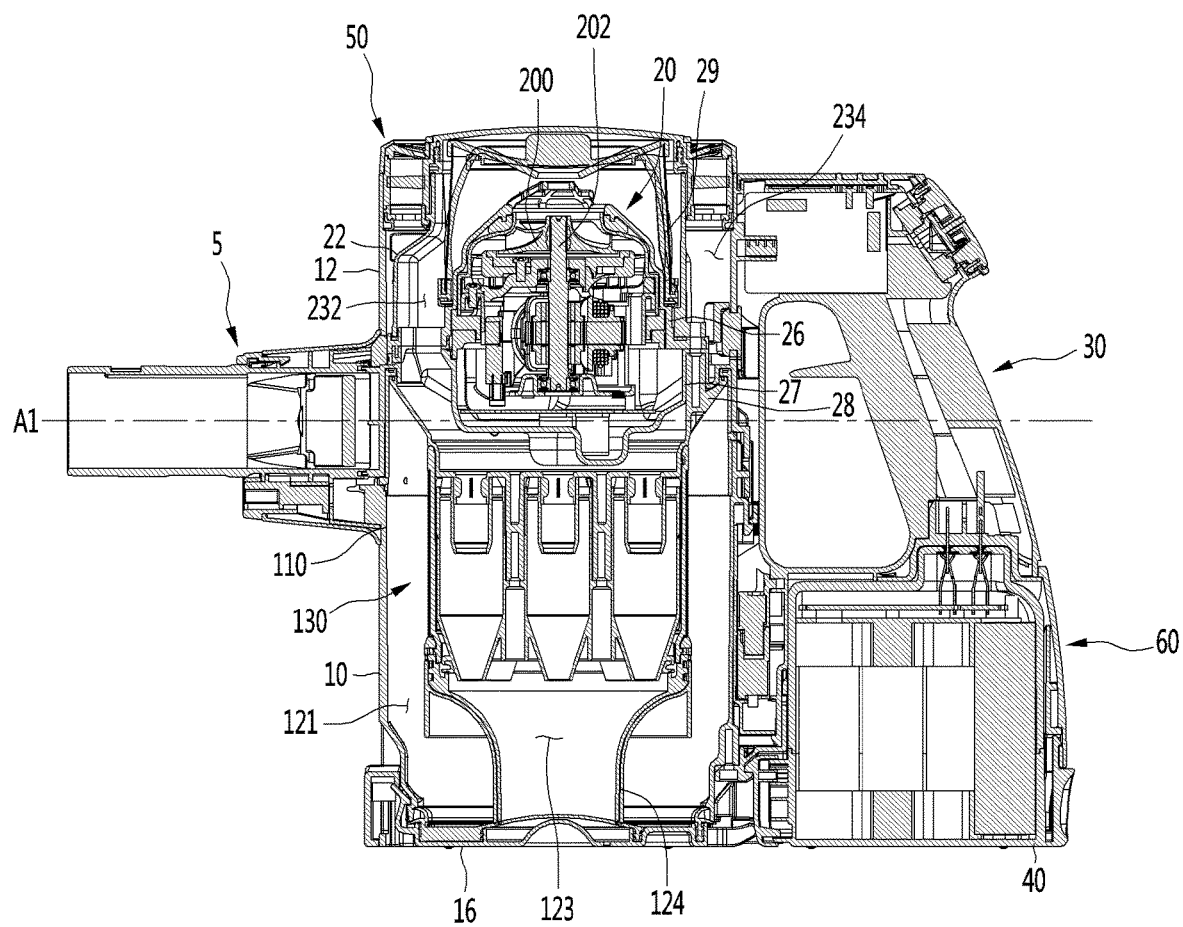
FIG. 5 is a vertical cross-sectional view of the cleaner according to an embodiment of the present invention.

FIG. 1 is a perspective view of a cleaner according to an embodiment of the present invention, FIG. 2 is a side view of the cleaner according to an embodiment of the present invention, FIG. 3 is a plan view of the cleaner according to an embodiment of the present invention, FIG. 4 is a perspective view of the cleaner according to an embodiment of the present invention when seen from under the cleaner, and FIG. 5 is a cross-sectional view of the cleaner according to an embodiment of the present invention.

Referring to FIGS. 1 to 5, a cleaner 1 according to an embodiment of the present invention may include a main body 2.

The cleaner 1 may further include a suction unit 5 coupled to the front of the main body 2. The suction unit 5 can guide air containing dust into the main body 2.

The cleaner 1 may further include a handle unit 3 coupled to the main body 2. The handle unit 3 may be positioned opposite to the suction unit 5 on the main body 2.

That is, the main body 2 may be disposed between the suction unit 5 and the handle unit 3.

The main body 2 may include a first body 10 and a second body 12 on the first body 10. The first body 10 and the second body 12 may be directly combined or may be indirectly combined through an intermediate member.

The first body 10 and the second body 12 may be, though not limited thereto, formed in a cylindrical shape.

The first body 10 and the second body 12 are open at the top and the bottom, respectively. That is, the bodies 10 and 12 may have a top opening and a bottom opening, respectively.

The suction unit 5 may be coupled to the main body 2 such that the center of the suction unit 5 is positioned approximately at the boundary between the first body 10 and the second body 12.

The main body 2 may further include a dust separation unit that separates dust from air sucked through the suction unit 5.

The dust separation unit may include a first cyclone unit 110 that can separate dust, for example, using cyclonic flow. The first body 10 includes the first cyclone unit 110 in this configuration.

The air and dust sucked through the suction unit 5 helically flow along the inner side of the first cyclone unit 110.

The axis of the cyclonic flow in the first cyclone unit 110 may vertically extend.

The dust separation unit may further include a second cyclone unit 130 that secondarily separates dust from the air discharged out of the first cyclone unit 110. The second cyclone unit 130 may be disposed inside the first cyclone unit 110 to minimize the size of the dust separation unit. The second cyclone unit 130 may include a plurality of cyclone bodies arranged in a row.

As another example, the dust separation unit may include one cyclone unit, in which the axis of the cyclonic flow may also vertically extend.

The first body 10 functions as a dust container that stores dust separated by the cyclone units 110 and 130.

The main body 2 may further include a body cover 16 for opening/closing the bottom of the first body 10. The body cover 16 can open/close the first body 10 by being rotated. A button 18 for rotating the body cover 16 may be disposed on the first body 10. A hinge 162 of the body cover 16 may be coupled to hinge coupling portions 620 of the battery housing 60.

At least a portion of the second cyclone unit 130 may be positioned inside the first body 10.

A dust storage guide 124 that guides the dust separated by the second cyclone unit 130 to be stored may be disposed in the first body 10. The dust storage guide 124 may be coupled to the bottom of the second cyclone unit 130 in contact with the top of the body cover 16.

The dust storage guide 124 may divide the internal space of the first body 10 into a first dust storage part 121 where the dust separated by the first cyclone unit 110 is stored and a second dust storage part 123 where the dust separated by the second cyclone unit 130 is stored.

The internal space of the dust storage guide 124 is the second dust storage part 123 and the space between the dust storage guide 124 and the first body 10 is the first dust storage part 121.

The body cover 16 can open/close both of the first dust storage part 121 and the second dust storage part 123.

The cleaner 1 may further include a suction motor 20 for generating suction force and a battery 40 for supplying power to the suction motor 20.

The suction motor 20 may be disposed in the second body 12. At least a portion of the suction motor 20 may be disposed over the dust separation unit. Accordingly, the suction motor 20 is disposed over the first body 10.

The suction motor 20 may communicate with an outlet of the second cyclone unit 130.

To this end, the main body 2 may further include a discharge guide 28 connected to the second cyclone unit 130 and a flow guide 22 that communicates with the discharge guide 28.

For example, the discharge guide 28 is disposed on the second cyclone unit 130 and the flow guide 22 is disposed over the discharge guide 28.

Further, at least a portion of the suction motor 20 is positioned inside the flow guide 22.

Accordingly, the axis of the cyclonic flow in the first cyclone unit 110 may pass through the suction motor 20.

When the suction motor 20 is disposed over the second cyclone unit 130, the air discharged from the second cyclone unit 130 can flow directly to the suction motor 20, so the channel between the dust separation unit and the suction motor 20 can be minimized.

The suction motor 20 may include a rotary impeller 200. The impeller 200 may be fitted on a shaft 202. The shaft 202 is vertically disposed.

An extension line from the shaft 202 (which may be considered as the rotational axis of the impeller 200) may pass through the first body 10. The rotational axis of the impeller 200 and the axis of the cyclonic flow in the first cyclone unit 180 may be on the same line.

According to the present invention, there is the advantage that the path through which the air discharged from the dust separation unit, that is, the air discharged upward from the second cyclone unit 130 flows to the suction motor 20 can be reduced and a change in direction of air can be decreased, so a loss of airflow can be reduced.

As the loss of airflow is reduced, suction force can be increased and the lifetime of the battery 40 for supplying power to the suction motor 20 can be increased.

The cleaner 1 may further include an upper motor housing 26 covering a portion of the top of the suction motor 20 and a lower motor housing 27 covering a portion of the bottom of the suction motor 20.

The suction motor 20 may be disposed inside the motor housings 26 and 27 and the flow guide 22 may be disposed to cover the upper motor housing 26.

At least a portion of the flow guide 22 may be spaced apart from the upper motor housing 26. Further, at least a portion of the flow guide 22 may be spaced apart from the second body 12.

Accordingly, a first air passage 232 is defined by the inner side of the flow guide 22 and the outer side of the upper motor housing 26 and a second air passage 234 is defined by the outer side of the flow guide 22 and the inner side of the second body 12.

The air discharged from the second cyclone unit 130 flows to the suction motor 20 through the first air passage 232 and the air discharged from the suction motor 20 flows through the second air passage 234 and is then discharged outside. Accordingly, the second air passage 234 functions as an exhaust channel.

The handle unit 3 may include a handle 30 for a user to hold and a battery housing 60 under the handle 30.

The handle 30 may be disposed behind the suction motor 20.

As for directions, with respect to the suction motor 20 in the cleaner 1, the direction in which the suction unit 5 is positioned is the front direction and the direction in which the handle 30 is positioned is the rear direction.

The battery 40 may be disposed behind the first body 10. Accordingly, the suction motor 20 and the battery 40 may be arranged not to vertically overlap each other and may be disposed at different heights.

According to the present invention, since the suction motor 20 that is heavy is disposed ahead of the handle 30 and the battery 40 that is heavy is disposed behind the handle 30, so weight can be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 20 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 320 extending toward the suction motor 20 over the first extension 310. The second extension 320 may at least partially horizontally extend. In the present invention, the first extension 310, which is a portion that a user can hold (a portion that a user's palm can come in contact with), may be referred to as a grip part.

A stopper 312 for preventing a user's hand holding the first extension 310 from moving in the longitudinal direction of the first extension 310 (vertically in FIG. 2) may be formed on the first extension 310. The stopper 312 may extend toward the suction unit 5 from the first extension 310.

The stopper 312 is spaced apart from the second extension 320. Accordingly, a user is supposed to hold the first extension 310, with some of the fingers over the stopper 312 and the other fingers under the stopper 312.

For example, the stopper 312 may be positioned between the index finger and the middle finger.

According to this arrangement, when a user holds the first extension 310, the longitudinal axis A1 of the suction unit 5 may pass through the user's wrist.

When the longitudinal axis A1 of the suction unit 5 passes through the user's wrist and the user's arm is stretched, the longitudinal axis A1 of the suction unit 5 may be substantially aligned with the user's stretched arm. Accordingly, there is the advantage in this state that the user uses minimum force when pushing or pulling the cleaner 1 with the handle 30 in his/her hand.

The handle 30 may include an operation unit 326. For example, the operation unit 326 may be disposed on an inclined surface of the second extension 320. It is possible to input instructions to turn on/off the cleaner (suction motor) through the operation unit 326. For example, it is possible to input instructions to turn on/off the suction motor through the operation unit 326. Further, it is possible to control the intensity of the suction force of the suction motor 20 that has been turned on through the operation unit 326.

The operation unit 326 may be disposed to face a user. The operation unit 326 may be disposed opposite to the stopper 312 with the handle 30 therebetween.

The operation unit 326 is positioned higher than the stopper 312. Accordingly, a user can easily operate the operation unit 326 with his/her thumb with the first extension 310 in his/her hand.

Further, since the operation unit 326 is positioned outside the first extension 310, it is possible to prevent the operation unit 326 from being unexpectedly operated when a user cleans with the first extension 310 in his/her hand.

A display unit 322 for showing operational states may be disposed on the second extension 320. The display unit 322 may be, for example, disposed on the top of the second extension 320. Accordingly, a user can easily check the display unit 322 on the top of the second extension 320 while cleaning. The display 322, for example, can show the remaining capacity of the battery 40 and the intensity of the suction motor.

The display unit 322, though not limited, may include a plurality of light emitting devices. The light emitting devices may be spaced apart from each other in the longitudinal direction of the second extension 320.

The battery housing 60 may be disposed under the first extension 310.

The battery 40 may be detachably combined with the battery housing 60. For example, the battery 40 may be inserted into the battery housing 60 from under the battery housing 60.

The rear side of the battery housing 60 and the rear side of the first extension 310 may form a continuous surface. Accordingly, the battery housing 60 and the first extension 310 can be shown like a single unit.

When the battery 40 is inserted in the battery housing 60, the bottom of the battery 40 may be exposed to the outside. Accordingly, when the cleaner 1 is placed on the floor, the battery 40 can be in contact with the floor.

According to this structure, there is the advantage that the battery 40 can be directly separated from the battery housing 60.

Further, since the bottom of the battery 40 is exposed to the outside, the bottom of the battery 40 can come in direct contact with the air outside the cleaner 1, so the battery 40 can be more efficiently cooled.

Referring to FIG. 3, the cleaner 1 may further include a filter unit 50 having air exits 522 for discharging the air that has passed through the suction motor 20. For example, the air exits 522 may include a plurality of openings and the openings may be circumferentially arranged. Accordingly, the air exist 522 may be arranged in a ring shape.

The filter unit 50 may be detachably coupled to the top of the main body 2. The filter unit 50 may be detachably inserted in the second body 12.

When the filter unit 50 is combined with the main body 2, a portion of the filter unit 50 is positioned outside the second body 12. Accordingly, a portion of the filter unit 50 is inserted in the main body 2 through the open top of the main body 2 and the other portion protrudes outside from the main body 2.

The height of the main body 2 may be substantially the same as the height of the handle 30. Accordingly, the filter unit 50 protrudes upward from the main body 2, so a user can easily hold and separate the filter unit 50.

When the filter unit 50 is combined with the main body 2, the air exits 522 are positioned at the upper portion of the filter unit 50. Accordingly, the air discharged from the suction motor 20 is discharged upward from the main body 2.

According to this embodiment, it is possible to prevent the air discharged from the air exits 522 from flowing to a user while the user cleans using the cleaner 1.

The main body 2 may further include a pre-filter 29 for filtering the air flowing into the suction motor 20. The pre-filter 29 may be disposed inside the flow guide 22. Further, the pre-filter 29 is seated over the upper motor housing 26 and may surround a portion of the upper motor housing 26. That is, the upper motor housing 26 may include a filter support for supporting the pre-filter 29.

Figure 6:
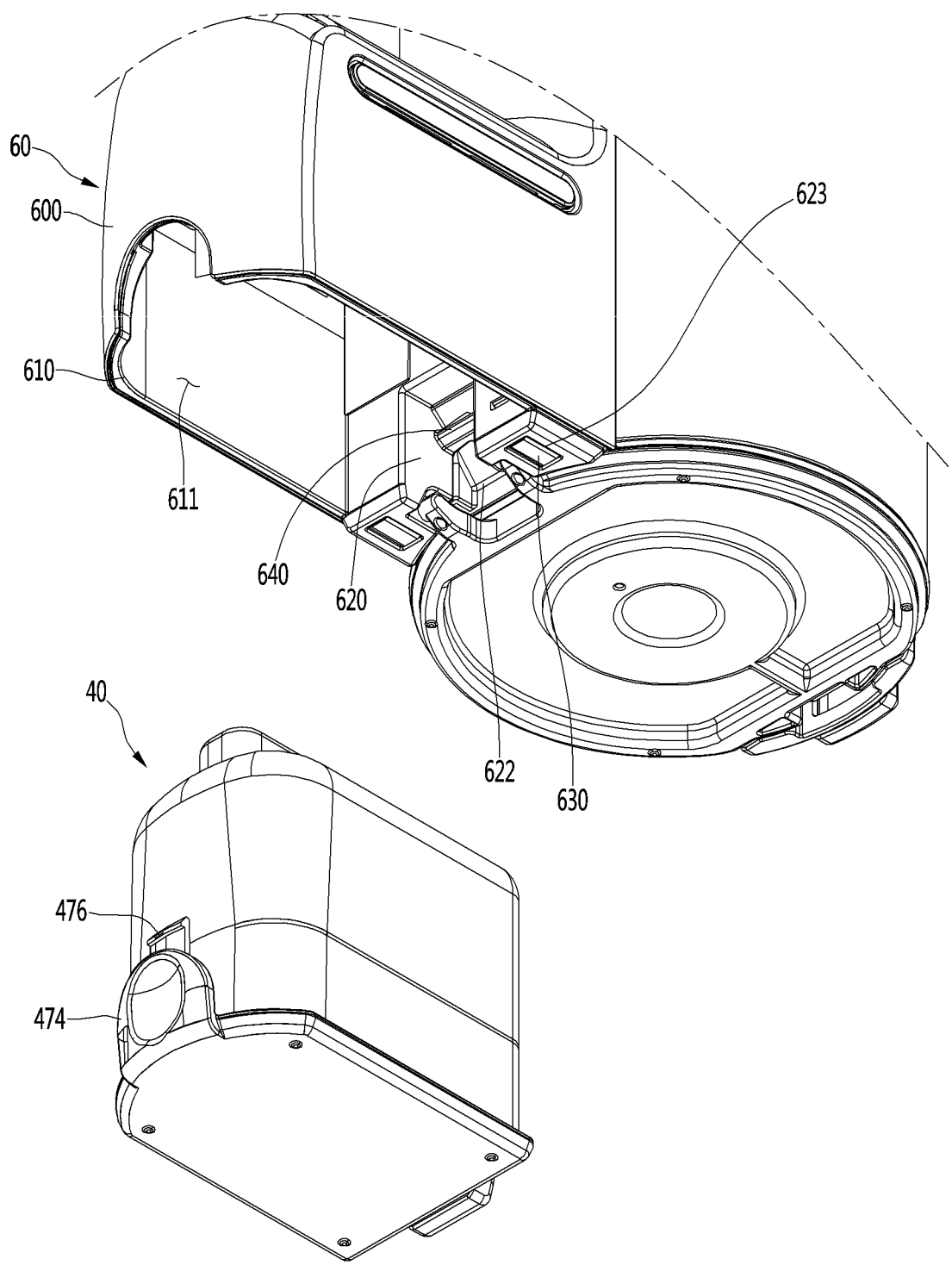
FIG. 6 is a view when a battery according to an embodiment of the present invention has been separated from a battery housing.
Figure 7:
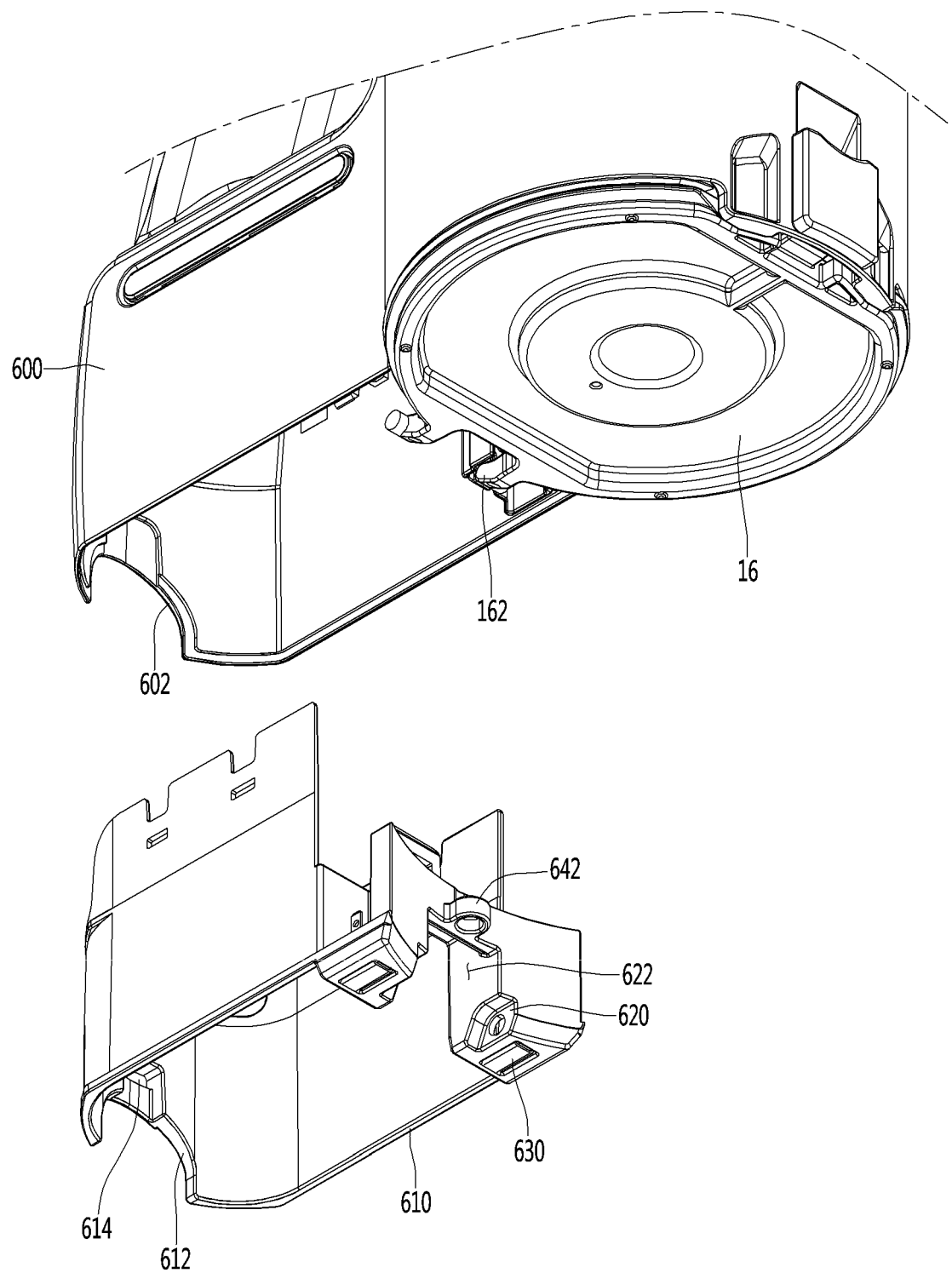
FIG. 7 is a view when an inner housing according to an embodiment of the present invention has been separated from the battery housing.
Figure 8:
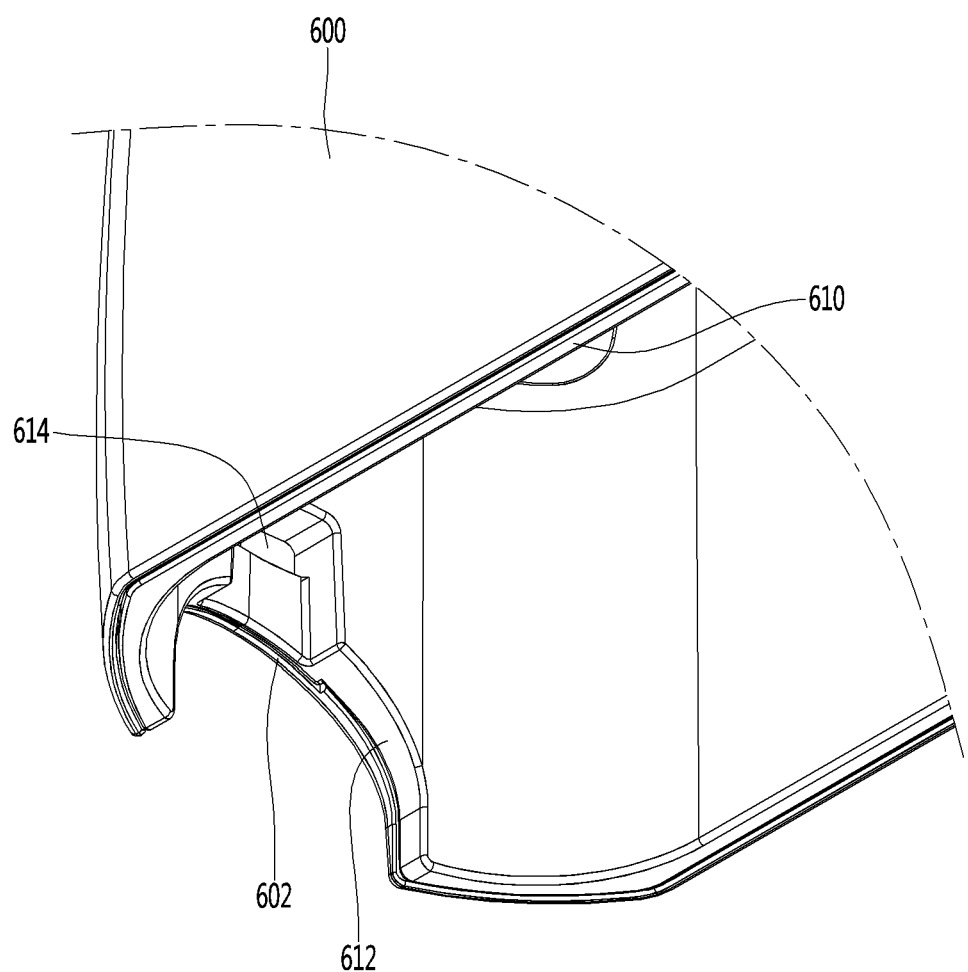
FIG. 8 is a view after the inner housing shown in FIG. 7 is coupled to the battery housing.

FIG. 6 is a view when a battery according to an embodiment of the present invention has been separated from a battery housing, FIG. 7 is a view when an inner housing according to an embodiment of the present invention has been separated from the battery housing, and FIG. 8 is a view after the inner housing shown in FIG. 7 is coupled to the battery housing.

Figure 9:
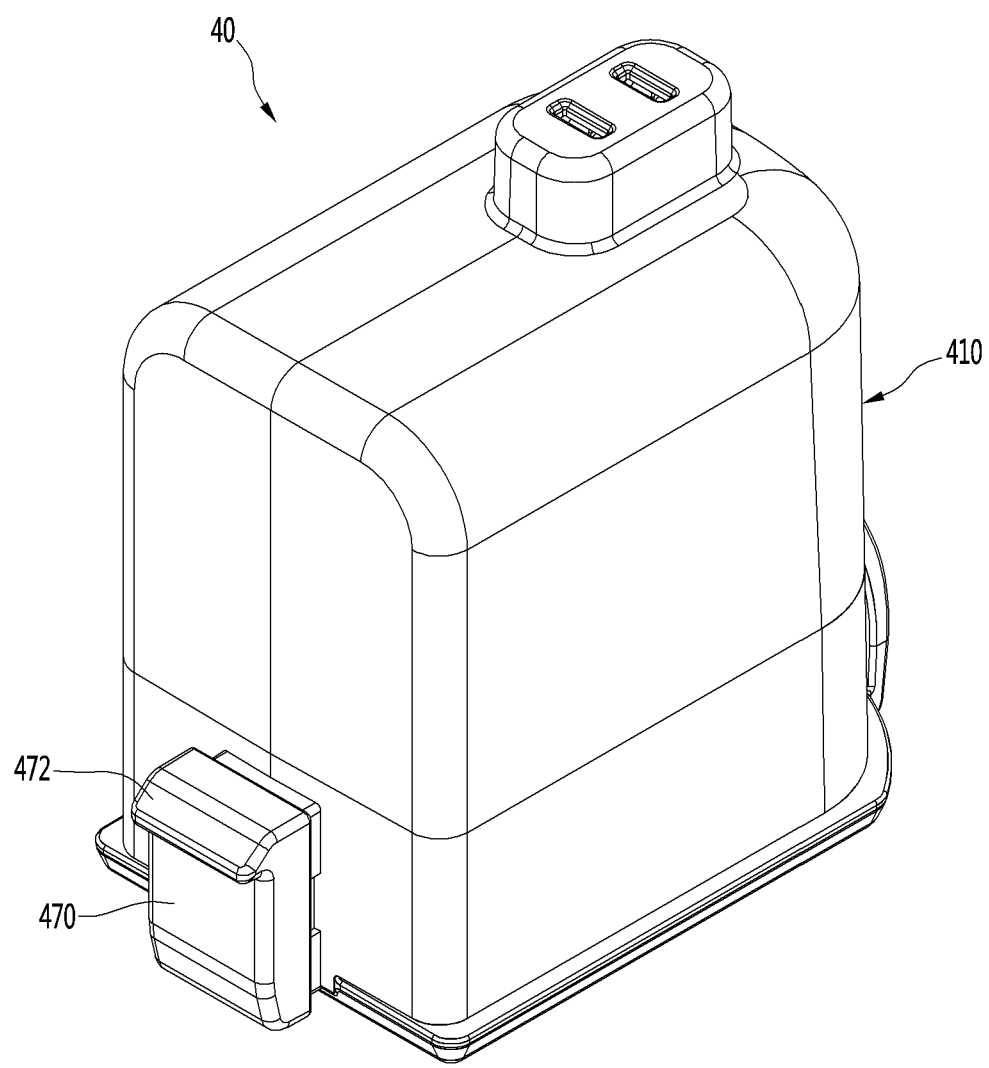
FIG. 9 is a perspective view of the battery according to an embodiment of the present invention.
Figure 10:
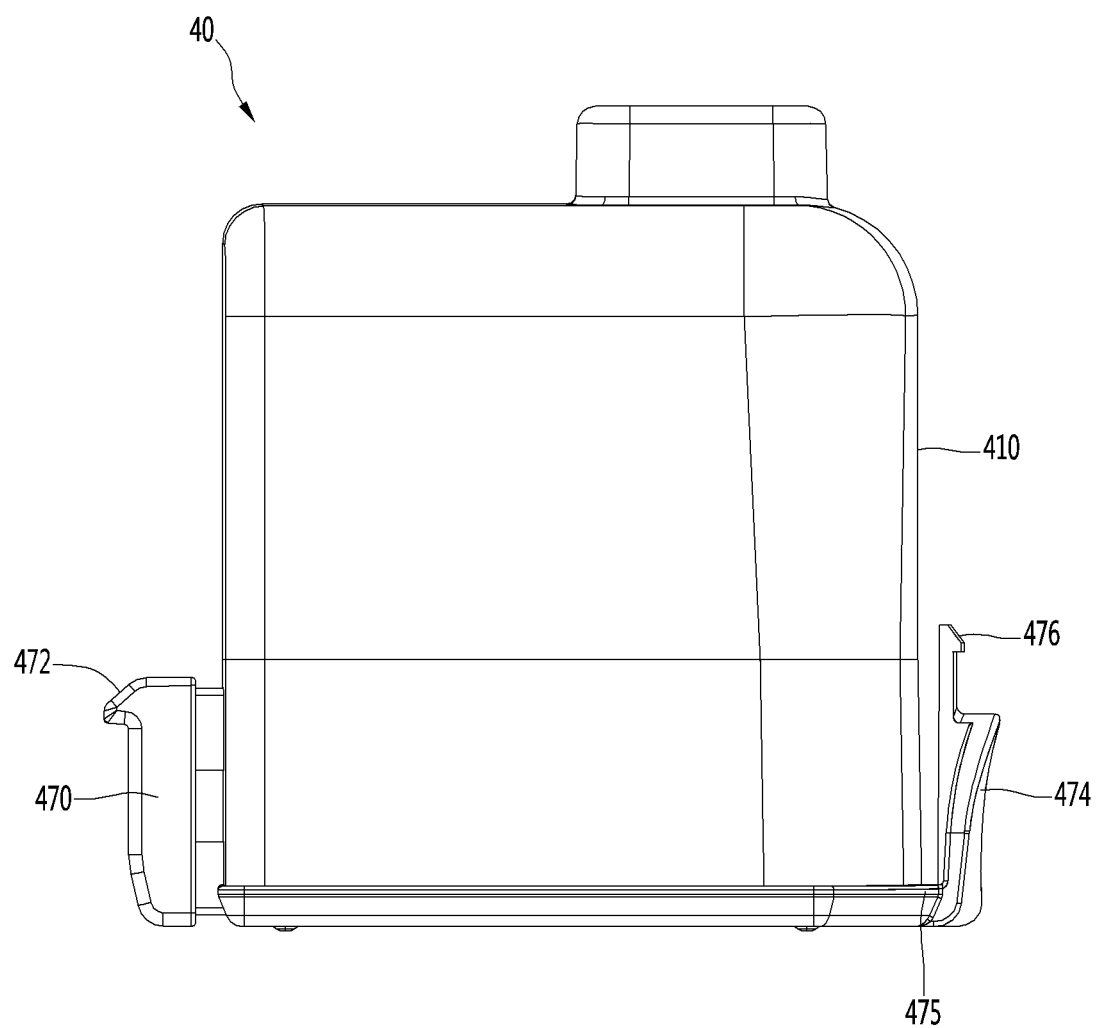
FIG. 10 is a front view of the battery shown in FIG. 9.

FIG. 9 is a perspective view of the battery according to an embodiment of the present invention and FIG. 10 is a front view of the battery shown in FIG. 9.

Referring to FIGS. 6 to 10, the battery housing 60 may include an outer housing 600 that is integrally formed with the handle 30 and an inner housing 610 that can be inserted in the outer housing 600.

The inner housing 610 may be inserted a lower side of the outer housing 600. The inner housing 610 provides a battery chamber 611 for receiving the battery 40.

The inner housing 610 may be fixed to one or more of the outer housing 600 and the first body 10. Further, the battery 40 may be coupled to the inner housing 610.

According to the present embodiment, the inner housing 610 is inserted into the outer housing 600 and then the battery 40 is inserted to be coupled to the inner housing 610, so it is possible to prevent the outer housing 600 from deforming or to prevent the outer housing 600 from being damaged when inserting or separating the battery 40.

Obviously, it may be possible to integrally form the inner housing 610 with the outer housing 600 without separately forming the inner housing 610.

The inner housing 610 may have a pair of hinge coupling portions 620 to which a hinge 162 of the body cover 16 is coupled. The hinge coupling portions 620 may be spaced at a predetermined distance from each other. Accordingly, a space 622 may be formed between the hinge coupling portions 620.

The inner housing 610 may further include a body fastening portion 642 to be fastened to the first body 10.

The inner housing 610 may further include first main body terminals 630 for charging the battery 40 coupled to the inner housing 610. It is possible to bring charging stand terminals in contact with the first main body terminals 630 by placing the cleaner 1 on a charging stand (not shown).

The first main body terminals 630 are disposed on the bottoms of the hinge coupling portions 620, but can be spaced apart from the floor when the cleaner 1 is placed on the floor. That is, terminal grooves 623 that are concave upward are formed on the bottoms of the hinge coupling portions 620 and the first main body terminals 630 can be disposed in the terminal grooves 623. Accordingly, damage to the first main body terminals 630 can be prevented.

Further, since the first main body terminals 630 are disposed in the terminal grooves 623, water cannot come in contact with the first main body terminals 630 when the cleaner 1 is placed on a floor.

The battery 40 may include a frame 410 that forms the external shape. The frame 410 and the battery chamber 611 may be formed in shapes corresponding to each other.

The battery 40 may further include a plurality of coupling portions 470 and 474. The coupling portions 470 and 474 may include a first coupling portion 470 disposed on a first side of the frame 410 and a second coupling portion 474 disposed on a second side of the frame 410. The first coupling portion 470 and the second coupling portion 474, for example, may be positioned opposite to each other.

The first coupling portion 470 may include a first hook 472. The first coupling portion 470 may be movably coupled to the outer side of the frame 410. The first coupling portion 470 can be elastically supported by an elastic member 473 (see FIG. 23) in the frame 410.

A locking rib 640 for locking the first hook 472 of the first coupling portion 470 may be formed between the hinge coupling portions 620.

While the battery 40 is coupled, the first hook 472 of the first coupling portion 470 can be locked to the locking rib 640 through the space 622.

The second coupling portion 474 is integrally formed with the frame 410 and can be elastically deformed by external force.

In detail, an extension 475 horizontally extends from the bottom of the frame 410 and the second coupling portion 474 extends upward from the end of the extension 475. The second coupling portion 474 is spaced from the outer side of the frame 410 by the extension 475.

That is, a space for deformation is defined between the frame 410 and the second coupling portion 474. The second coupling portion 474 can be elastically deformed toward the frame 410 by the space.

The second coupling portion 474 may include a second hook 476. The second hook 476 may be thinner than other portion of the second coupling portion 474.

The outer housing 600 has a first exposing hole 602 and the inner housing 610 has a second exposing hole 612 to expose the second coupling portion 474 to the outside so that the second coupling portion 474 can be operated with the battery 40 in the battery chamber 611.

Further, a coupling slot 614 for coupling the second hook 476 of the second coupling portion 474 may be formed over the second exposing hole 612 of the inner housing 610. The coupling slot 614 may be a hole or a groove.

The second hook 476 of the second coupling portion 474 can be inserted into the locking slot 614 when being inserted in the inner housing 610.

Figure 11:
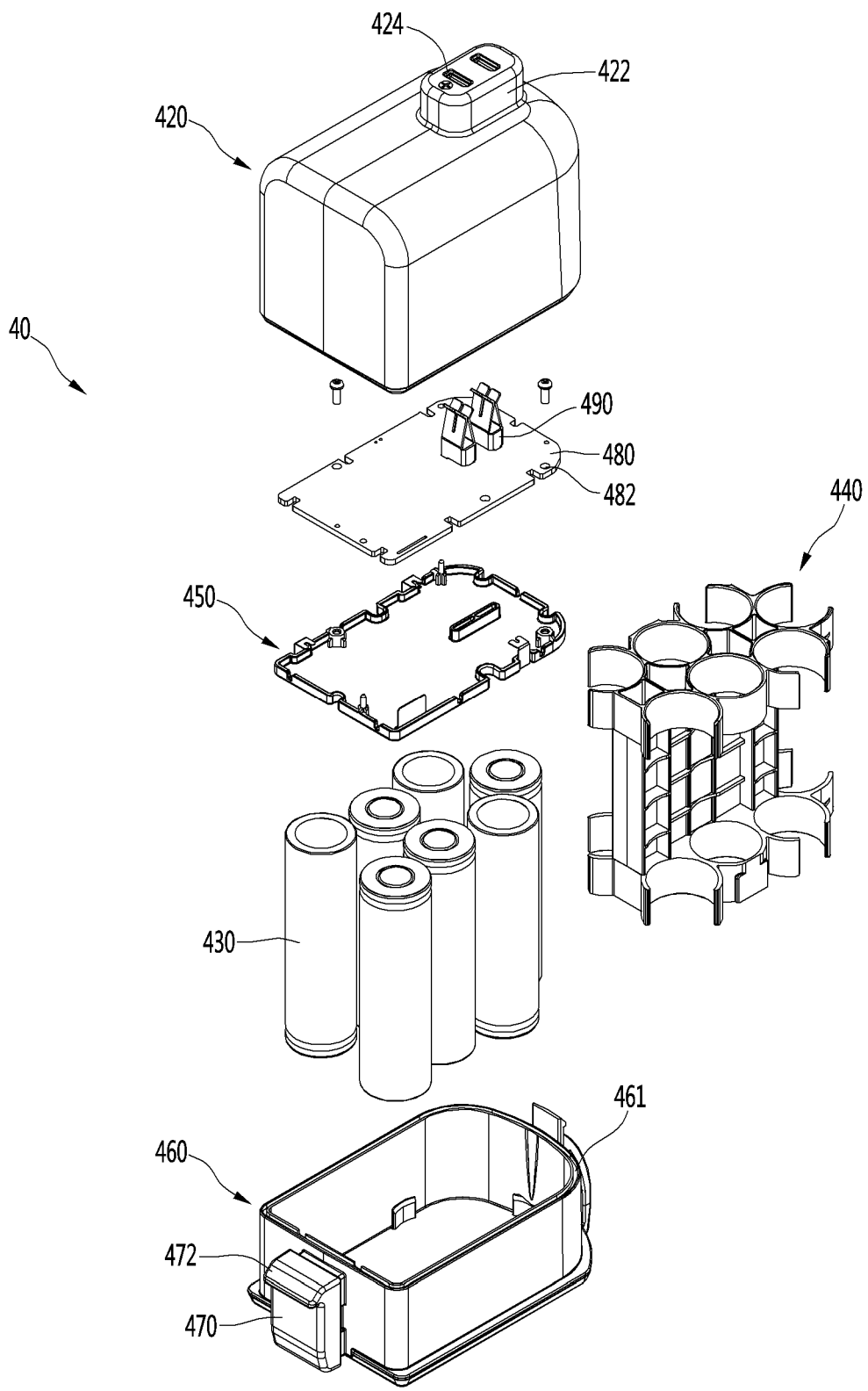
FIG. 11 is an exploded perspective view of the battery according to an embodiment of the present invention.
Figure 12:
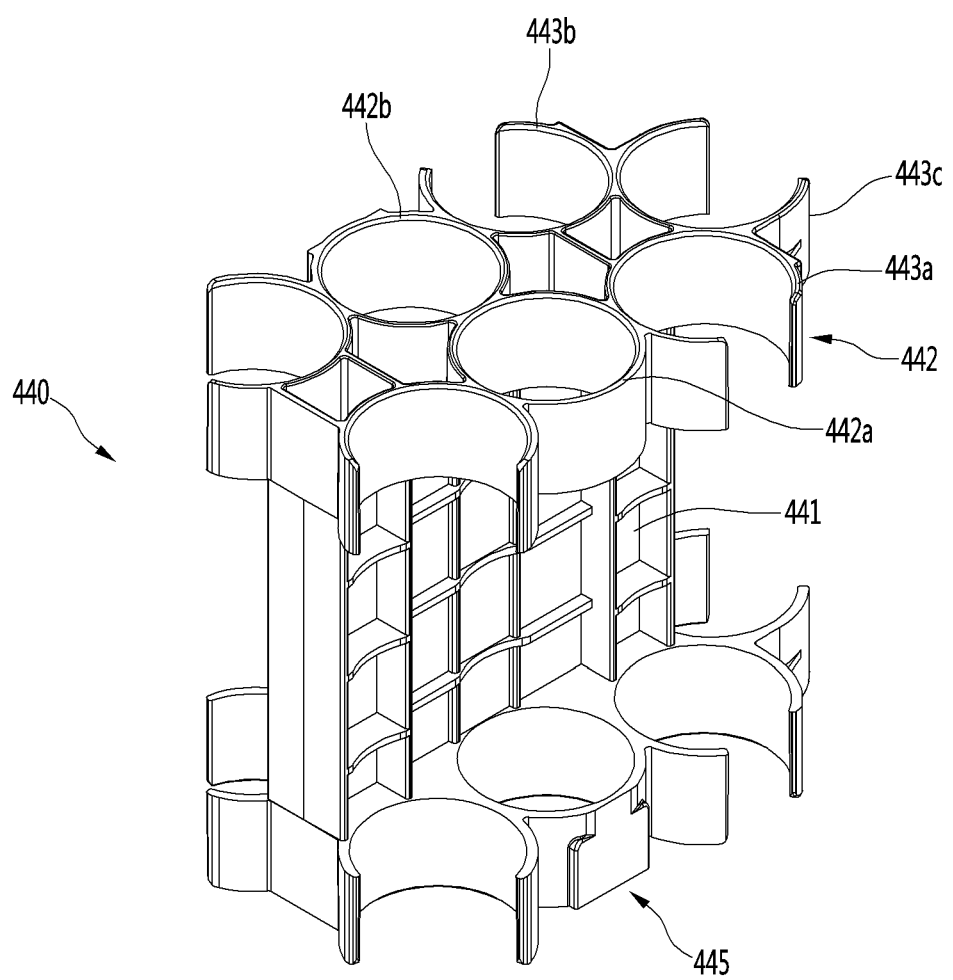
FIG. 12 is a perspective view showing a battery holder of the present invention.
Figure 13:
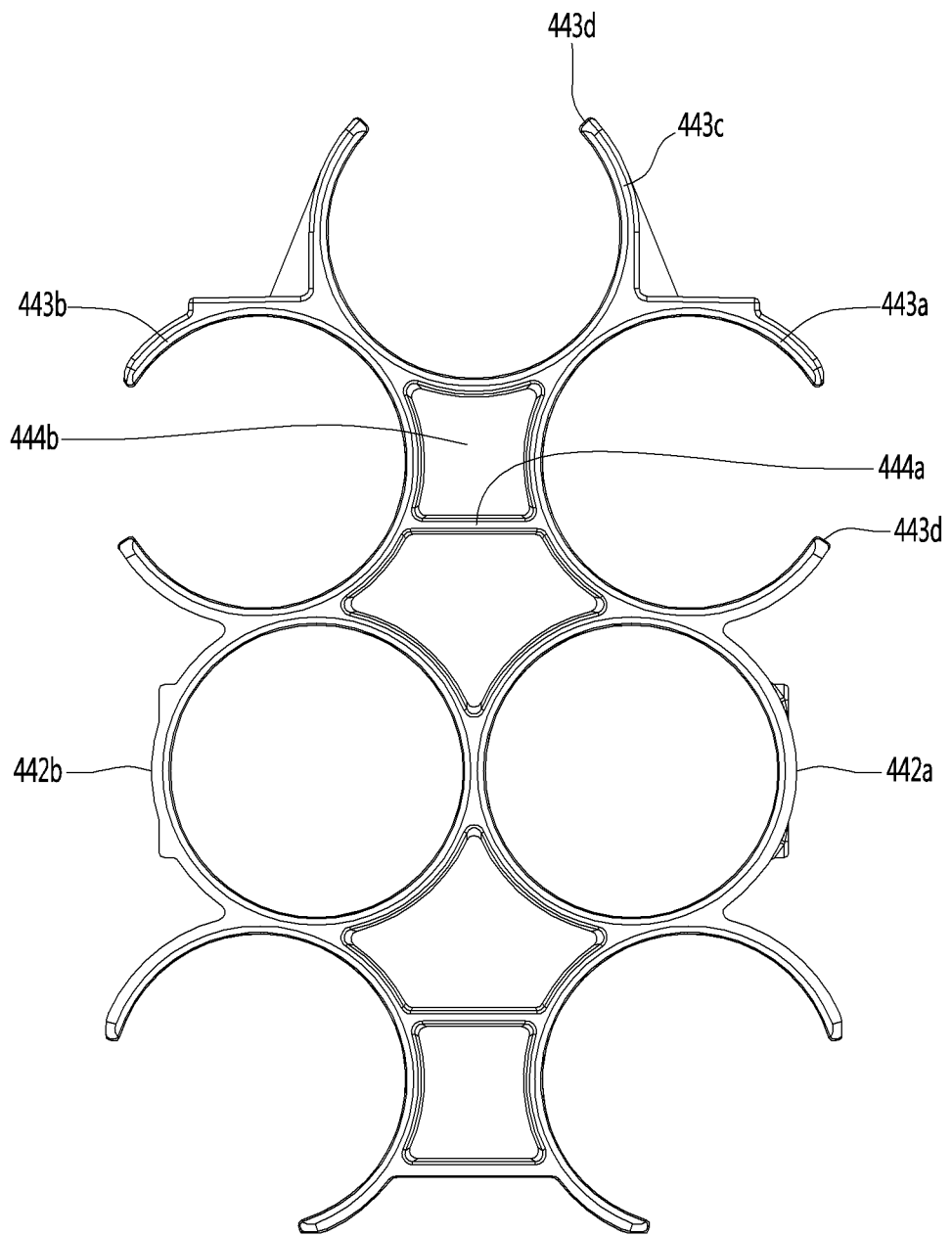
FIG. 13 is a plan view of the battery holder shown in FIG. 12.

FIG. 11 is an exploded perspective view of the battery according to an embodiment of the present invention, FIG. 12 is a perspective view showing a battery holder of the present invention, and FIG. 13 is a plan view of the battery holder shown in FIG. 12.

Referring to FIGS. 10 to 13, the battery 40 may further include a plurality of battery cells 430, a battery holder 440 supporting the battery cells 430, a battery management unit 480 managing the voltage of the battery cells 430, and battery terminals 490 connected to the battery management unit 480.

The battery cells 430, the battery holder 440, and the battery management unit 480 may be covered by the frame 410.

The battery 40 may further include a barrier 450 disposed between the battery cells 430 and the battery management unit 480.

The barrier 450 blocks heat transferring from the battery cells 430 to the battery management unit 480.

The frame 410 may include a first frame 420 and a second frame 460 coupled to the lower portion of the first frame 420.

A protrusion 422 is formed on the top of the first frame 420 and terminal holes 424 through which second main body terminals 670 (see FIG. 23) to be described below pass may be formed in the protrusion 422.

The terminal holes 424 are formed through the top of the protrusion 422. Accordingly, while the battery 40 is inserted upward into the battery hosing 60, the second main body terminals 670 (see FIG. 23) can be connected to the battery terminals 490 through the terminal holes 424.

The protrusion 422 may be positioned at a side from the center of the first frame 420 so that a user can easily recognize the direction in which the battery 40 is inserted into the battery housing 60. For example, the protrusion 422 may be positioned closer to the second coupling portion 474 between the first coupling portion 470 and the second coupling portion 474.

A seat 461 in which the lower end of the first frame 410 is seated may be formed at the top of the second frame 460.

The battery management unit 480 may be coupled to the top of the barrier 450. The battery management unit 480 may include one or more fastening holes 482 to be fastened to the barrier 450 by fasteners.

The battery holder 440 allows the battery cells 430 to be arranged in erected positions. For example, the longitudinal direction of the battery cells 430 may be in parallel with the directions in which the battery 40 is inserted into and separated from the battery housing 60.

The battery holder 440 allows the battery cells 430 to be arranged in a plurality of rows.

For example, the battery cells 430, though not limited, may include seven battery cells and the battery holder 440 may allow some of the seven battery cells to be arranged in two rows. However, it should be noted that the number of the battery cells 430 is not limited.

The battery holder 440 may have a separation wall 441 for dividing the battery cells 430 in two separate rows, first holders 442 formed at the upper portion of the separation wall 441, and second holders 445 formed at the lower portion of the separation wall 441.

The first holders 442 surround the upper portions of the battery cells 430 and the second holder 445 surround the lower portions of the battery cells 430.

The first holders 442 and the second holders 445 are vertically spaced from each other.

According to this configuration of the present embodiment, there is an advantage in that even if the battery cells 430 in any one of the two rows ignite, the battery cells 430 in the other row are prevented from being ignited by the separation wall 441.

Further, heat generated by the battery cells 430 in the two rows can be prevented from influencing each other in other rows by the separation wall 441.

The structure and shape of the second holders 445 are the same as those of the first holders 442, so hereafter, only the first holders 442 are described in detail and the description of the first holders 442 is referred to for the structure and shape of the second holders 445.

The first holders 442 may include cell cases 442a, 442b, 443a, 443b, and 443c that surround the upper portions of the battery cells 430.

The battery cells 430 are spaced from each other with the upper portions surrounded by the cell cases 442a, 442b, 443a, 443b, and 443c.

The cell cases 442a, 442b, 443a, 443b, and 443c may include first cell cases 442a and 442b that surround the entire outer sides of some of the battery cells 430, second cell cases 443a and 443b that partially surround the outer sides of some of the battery cells 430, and a third cell case 443c disposed between the two cell cases 443a and 443b.

For example, the first cell cases 442a and 442b may be formed in a cylindrical shape, and the second cell cases 443a and 443b and the third cell case 443c may be formed in a C-shape having an opening 443d.

In detail, two first cell cases 442a and 442b are in contact with each other, in which any one first cell case 442a surrounds a battery cell 430 in the first row and the other first cell case 442b surround a battery cell 430 in the second row.

Further, two second cell cases 443a and 443b may be horizontally spaced from each other with the separation wall 441 therebetween and may be connected to connectors 444a and 444b.

The connectors 444a and 444b may include a first connector 444a vertically connecting the two second cell cases 443a and 443b and a second connector 444b horizontally extending and connecting the two second cell cases 443a and 443b. The second connector 444b may be in contact with the upper portion of the separation wall 441.

By the connectors 444a and 444b, not only two spaced second cell cases 443a and 443b are connected, but the strength is improved.

The distance between the centers of the two second cell cases 443a and 443b is longer than the distance between the centers of the two first cell cases 442a and 442b.

The first cell cases 442a and 442b may be disposed between two groups of second cell cases 443a and 443b.

That is, a second cell case, a first cell case, and a second cell case may be sequentially arranged. According to this arrangement, the battery cells 430 can be arranged in a zigzag pattern in each row, so the horizontal length of the battery 40 can be reduced.

Since the battery cells 430 are arranged in a zigzag pattern, even if the number of the battery cells 430 is increased, the size of the battery 40 is not increased not that much, so the maximum chargeable voltage of the battery 40 can be increased.

Further, even if two second cell case 443a and 443b are spaced from each other with the separation wall 441 therebetween, the two second cell cases 443a and 443b, so the size of the first holder 442 can be reduced, thus the size of the frame 410 can be reduced.

The third cell case 443c is disposed between two spaced second cell cases 443a and 443b. Therefore, according to the present invention, the horizontal length of the battery 40 can be reduced.

Figure 14:
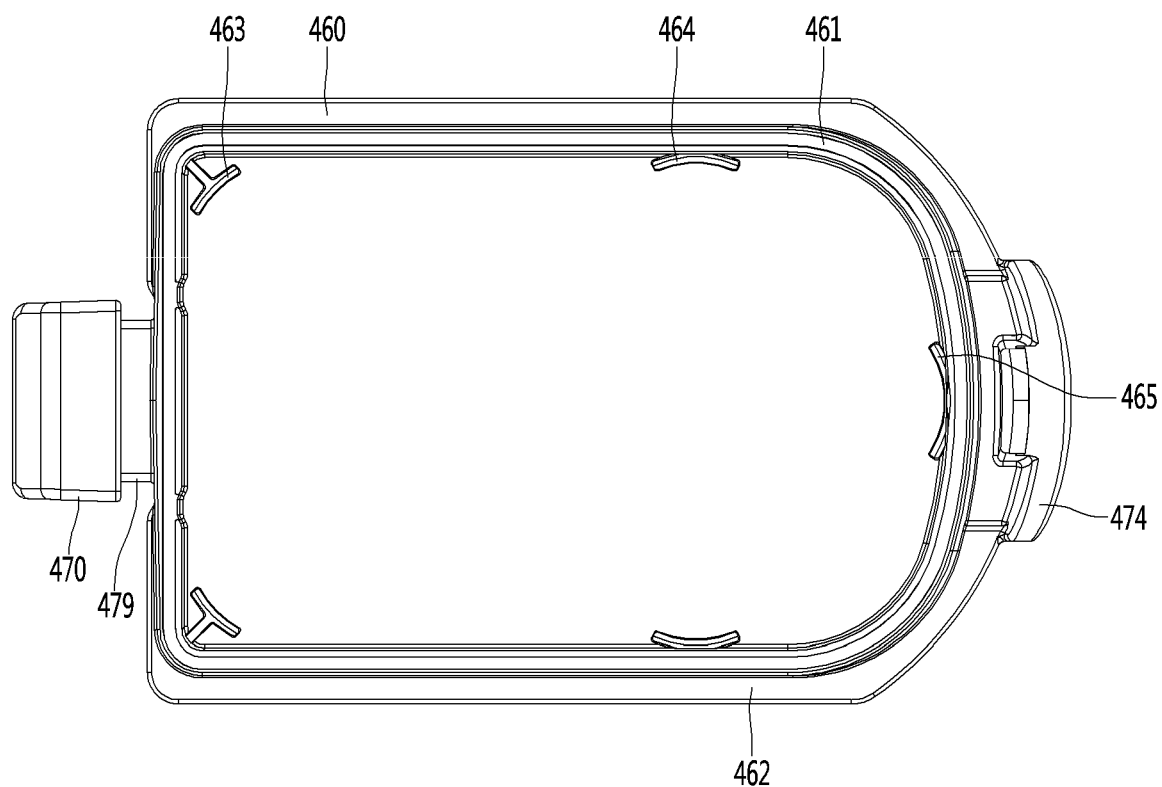
FIG. 14 is a plan view of a second frame according to an embodiment of the present invention.
Figure 15:
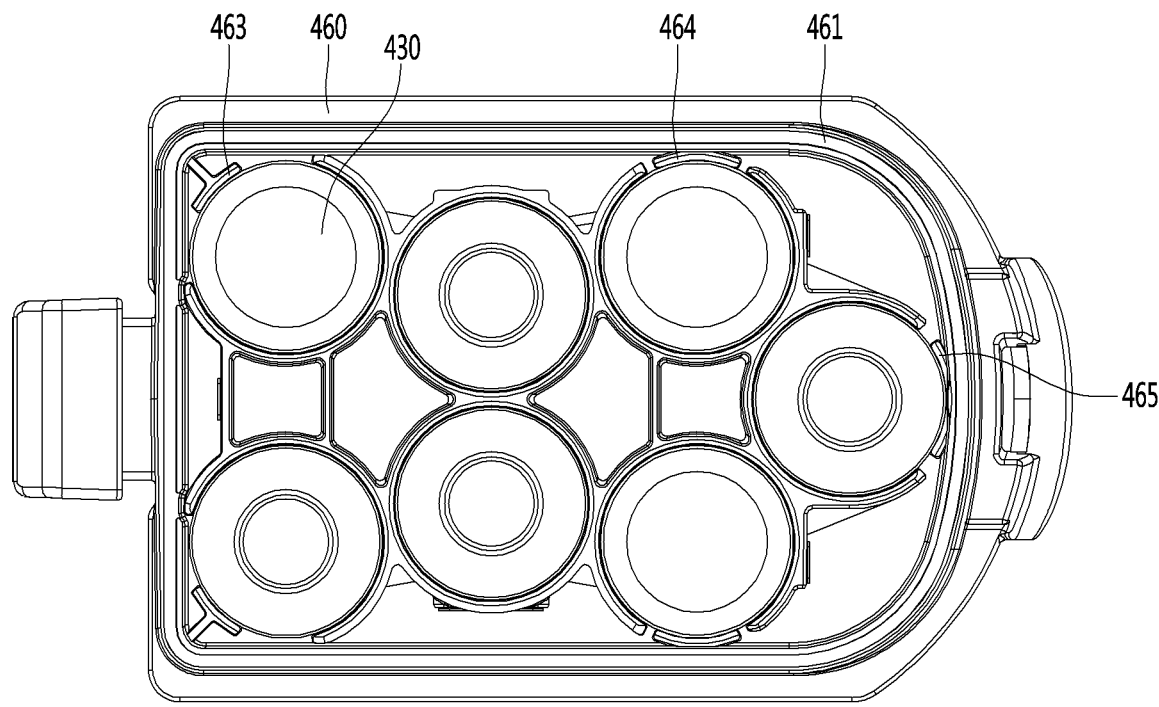
FIG. 15 is a plan view after a battery holder and battery cells are seated inside the second frame.

FIG. 14 is a plan view of a second frame according to an embodiment of the present invention and FIG. 15 is a plan view after the battery holder and the battery cells are seated inside the second frame.

Referring to FIGS. 14 and 15, the second frame 460 may have a support flange 462 for supporting the lower ends of the inner housing 610 and the outer housing 600 with the battery 40 inserted in the battery housing 60.

The support flange 462 may horizontally extend outward from the bottom of the second frame 460.

A coupling body 479 for coupling the first coupling portion 470 is formed on one side around the second frame 460 and the second coupling portion 474 is formed on another side around the second frame 460.

The second frame 460 may further include contact ribs 463, 464, and 465 being in contact with the battery cells 430 retained in the battery holder 440.

The contact ribs 463, 464, and 465 prevent horizontal movement of the battery cells 430 in the frame 410 in contact with the battery cells 430.

The contact ribs 463, 464, and 465 may include first contact ribs 463 disposed at corners of the second frame 460, second contact ribs 464 being in contact with the battery cells 430 in the second cell cases 443a and 443b disposed between the first cell cases 442a and 442b and the third cell case 443c, and a third contact rib 465 being in contact with the battery cell 430 in the third cell case 443c.

As described above, since the second cell cases 443a and 443b and the third cell case 443c have the openings 443d, when the battery cells 430 are fitted in the second cell cases 443a and 443b and the third cell case 443c, the battery cells 430 are partially exposed to the outside, and accordingly, the contact ribs 463, 464, and 465 can come in contact with the battery cells 430.

The contact ribs 463, 464, and 465 may be rounded with a curvature corresponding to the curvature of the outer sides of the battery cells 430 to stably in contact with the battery cells 430.

When the battery holder 440 is disposed inside the second frame 460, a portion of the battery holder 440 may be spaced apart from the second frame 460. Accordingly, the space between the battery holder 440 and the second frame 460 functions as a heat dissipation space for heat from the battery cells 430 to be naturally dissipated.

Figure 16:
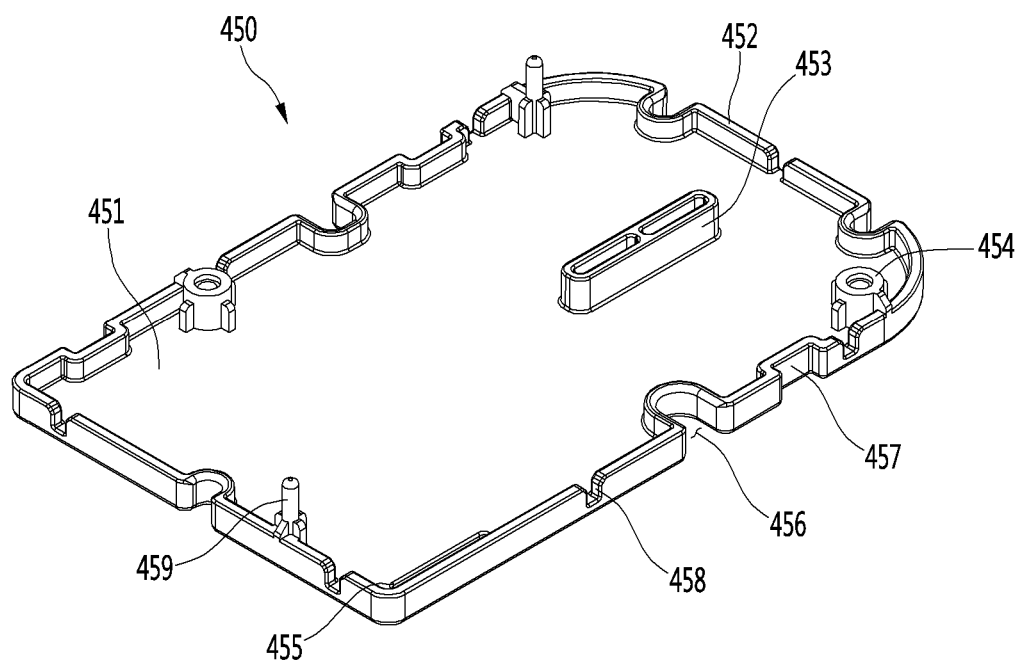
FIG. 16 is a perspective view of a barrier according to an embodiment of the present invention.
Figure 17:
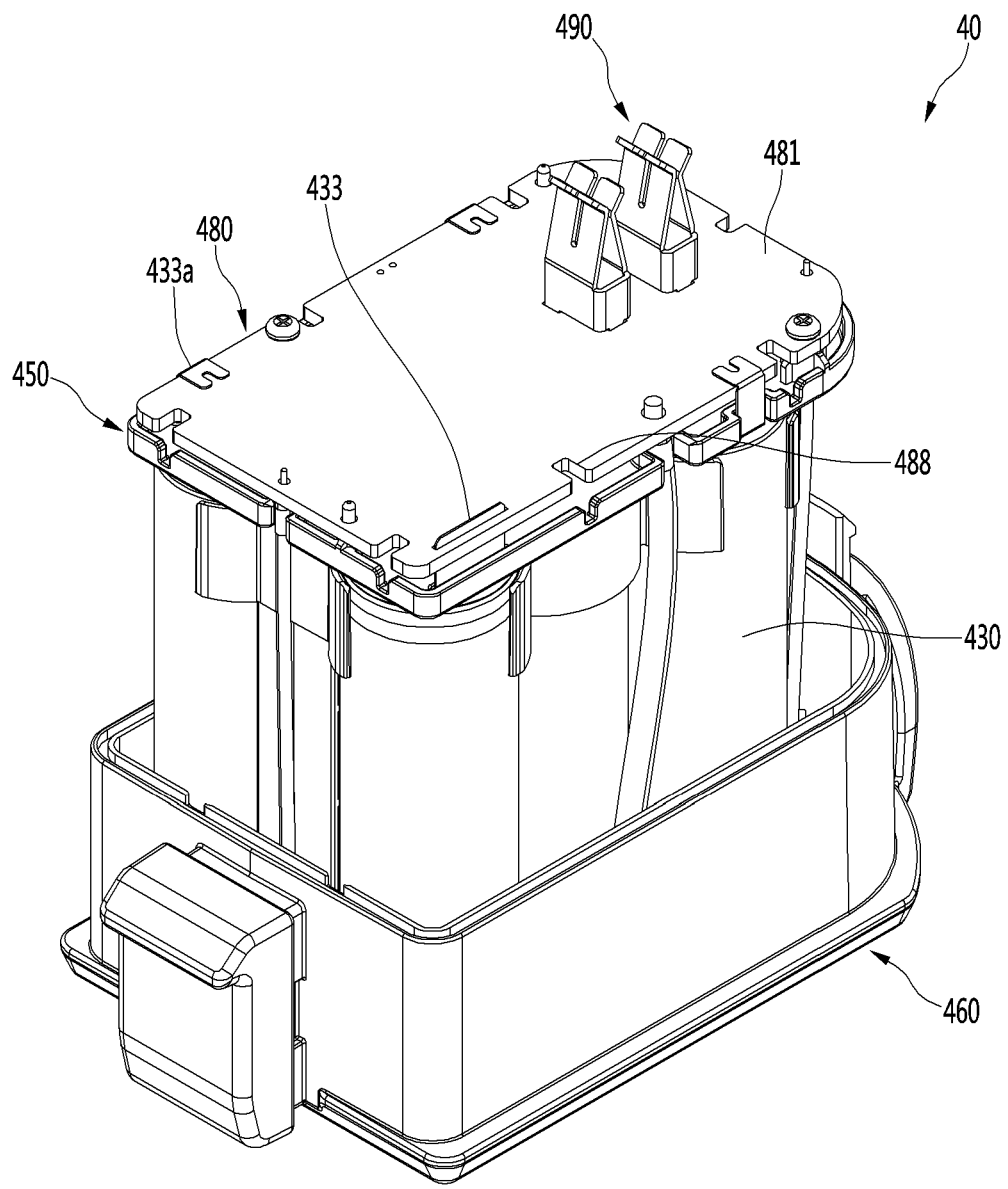
FIG. 17 is a perspective view showing the battery shown in FIG. 9 with a first frame removed.
Figure 18:
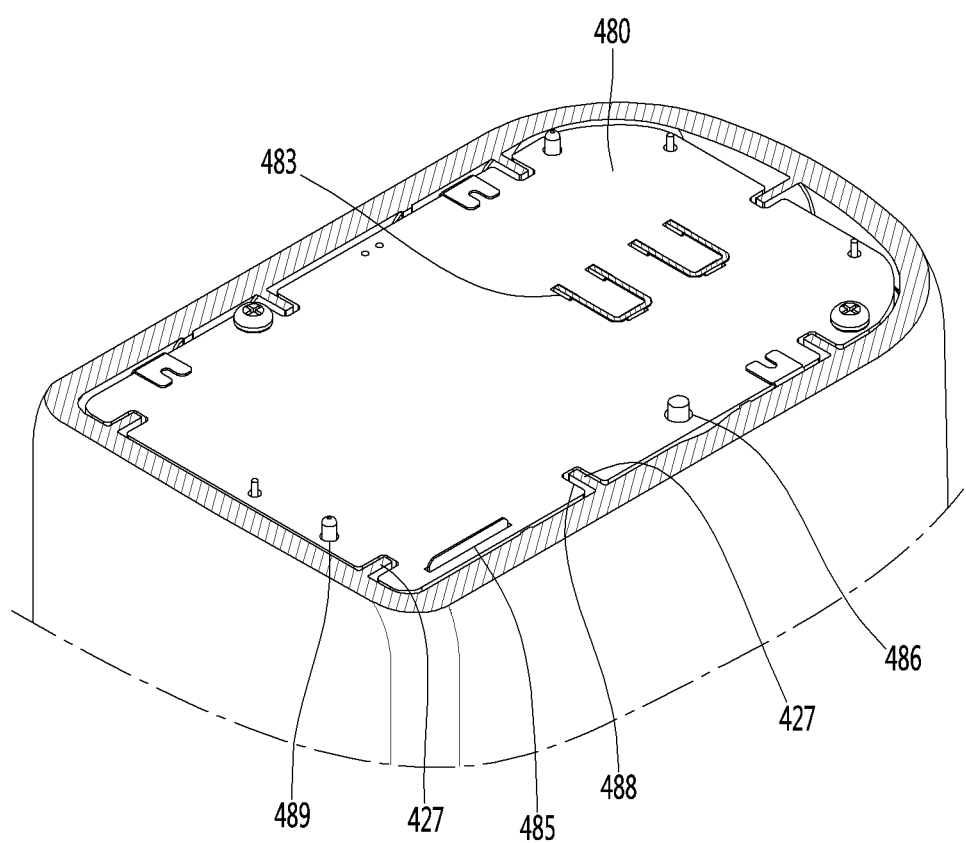
FIG. 18 is a horizontal cross-sectional view of the battery which shows the arrangement relationship between stop ribs of the first frame and a battery management unit.
Figure 19:
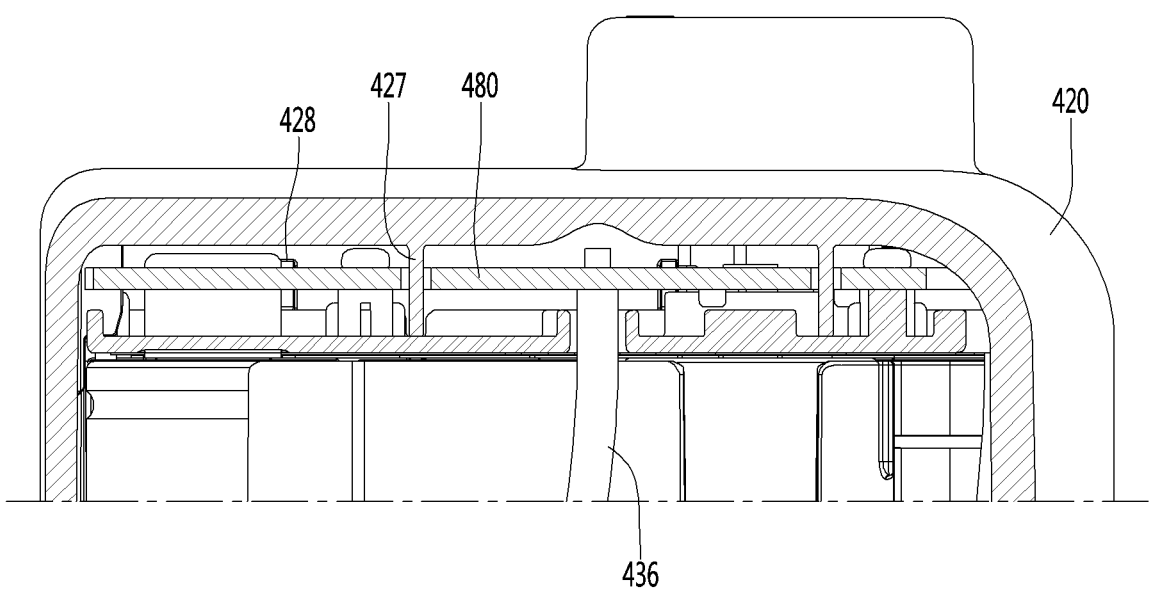
FIG. 19 is a vertical cross-sectional view of the battery which shows the arrangement relationship between the stop ribs of the first frame and the battery management unit.

FIG. 16 is a perspective view of the barrier according to an embodiment of the present invention, FIG. 17 is a perspective view showing the battery shown in FIG. 9 with a first frame removed, FIG. 18 is a horizontal cross-sectional view of the battery which shows the arrangement relationship between stop ribs of the first frame and a battery management unit, and FIG. 19 is a vertical cross-sectional view of the battery which shows the arrangement relationship between the stop ribs of the first frame and the battery management unit.

Referring to FIGS. 16 to 19, the barrier 450 may include a flat plate 451.

The plate 451 is disposed over the battery cell 430 to block heat transferring from the battery cell 430 to the battery management unit 480.

The barrier 450 may further include an outer rib 452 protruding upward along the edge of the plate 451. The outer rib 452 increases the strength of the barrier 450.

The battery management unit 480 may include a circuit board 481 and the battery terminals 490 may be directly formed on the circuit board 481. Pin holes 483 through which terminal connection pins to be described below pass may be formed at the battery management unit 480.

The circuit board 481 may be coupled to the barrier 450 over the plate 451. The circuit board 481 and the plate 451 are arranged in parallel and spaced from each other.

The longitudinal direction of the battery cell 430 may cross the circuit board 481 and the plate 451.

While the battery 40 is inserted into the battery housing 60, the second main body terminals 670 (see FIG. 23) are coupled to the battery terminals 490. When the second main body terminals 670 (see FIG. 23) are coupled to the battery terminals 490, a downward force may be applied to the battery terminals 490. The pressure applied to the battery terminals 490 may be transmitted to the circuit board 481 and the circuit board 481 is spaced apart from the plate 451, so when the circuit board 481 is pressed down, the circuit board 481 can be deformed, and in this case, the circuit board 481 may be broken.

In the present embodiment, the barrier 450 may further include an anti-deformation rib 453 extending toward the circuit board 481 from the plate 451 and preventing deformation of the battery management unit 480 in order to prevent breakage of the circuit board 481.

When the circuit board 481 is combined with the barrier 450, the anti-deformation rib 453 may be in contact with the circuit board 481, adjacent to the pin holes 483 of the circuit board 481.

Further, when the battery terminals 490 and the second main body terminals 670 (see FIG. 23) are separated, the anti-deformation rib 453 may be in contact with the circuit board 481.

Alternatively, the anti-deformation rib 453 may be disposed close to the circuit board 481, and it may be brought in contact with the bottom of the circuit board 481 when the circuit board 481 is pressed down.

The anti-deformation rib 453 may be spaced apart from the circuit board 481 when the second main body terminals 670 (see FIG. 23) is separated from the battery terminals, and it may be in contact with the circuit board 481 when the second main body terminals 670 (see FIG. 23) are coupled to the battery terminals 490.

The barrier 450 may further include one or more fastening bosses 454 to be fastened to the circuit board 481 by fasteners. The fastening bosses 454 may extend upward on the plate 451.

The fastening bosses 454 may be positioned inside the outer rib 452 and may be formed integrally with the outer rib 452.

The fastening bosses 454 protrude higher than the outer rib 452 from the plate 451 so that the outer rib 452 and the circuit board 481 can be spaced from each other when the barrier 450 and the circuit board 481 are fastened.

The plate 451 may include a guide hole 455 through which a first top conductive plate 433 passes and guide grooves 457 for guiding second top conductive plates 433*a*. The guide hole and grooves 455 and 457 guide the top conductive plates 433 and 433*a* to the circuit board 481, so they may be referred to as, in combination, a first guide.

The circuit board 481 may also include a guide hole 485 (or it may be referred to as a second guide) through which the first conductive plate 433 passes.

Though not shown in the figures, the anodes (+) and the cathodes (−) of two adjacent battery cells of the battery cells 430 may be connected through a conductor. The conductive plates 433 and 433*a* may be connected to the conductor connecting the two battery cells 430.

For example, since seven battery cells are provided in the present invention, three conductors may connect the anodes (+) and the cathodes (−) of two battery cells and one conductor may be connected to one electrode (anode (+) or cathode (−)) of one battery cell, over the battery cells.

The first top conductive plate 433 may be connected to the top of the circuit board 481 through the guide holes 485 of the plate 451 and the circuit board 481.

The second top conductive plates 433*a* may be guided upward along the guide grooves 457 and then bent horizontally, whereby they can be connected to the top of the circuit board 481.

Since the conductive plates 433 and 433*a* are connected to the circuit board 481, the battery management unit 480 can manage the voltage of the battery cells 430.

The plate 451 may include guide projections 459 for guiding the circuit board 481 when it is combined with the circuit board 481. The guide projection 459 may protrude upward from the plate 451. The guide projections 459 may protrude higher than the outer rib 452 to be able to pass through the circuit board 481.

Projection holes 489 through which the guide projections 459 pass may be formed at the circuit board 481.

On the other hand, the first frame 420 may include a plurality of stop ribs for preventing moment of the barrier and the battery management unit 480 inside the first frame 420.

The stop ribs may protrude from the inner side of the first frame 420. The stop ribs may include a first stop rib 427 and a second stop rib 428.

The circuit board 481 may include a rib slot 488 through which the first stop rib 427 passes and the barrier 450 may include a rib seat 458 in which the first stop rib 427 passing through the rib slot 488 is seated.

When the first stop rib 427 is seated in the rib seat 458, the first stop rib 427 may be seated on the plate 451. The second stop rib 428 may be seated on the outer rib 452.

When the first stop rib 427 is seated in the rib seat 458 through the rib slot 488 and the second stop rib 428 is seated on the outer rib 452, not only horizontal movement, but upward movement of the barrier 450 and the battery management unit 480 are restricted.

Figure 20:
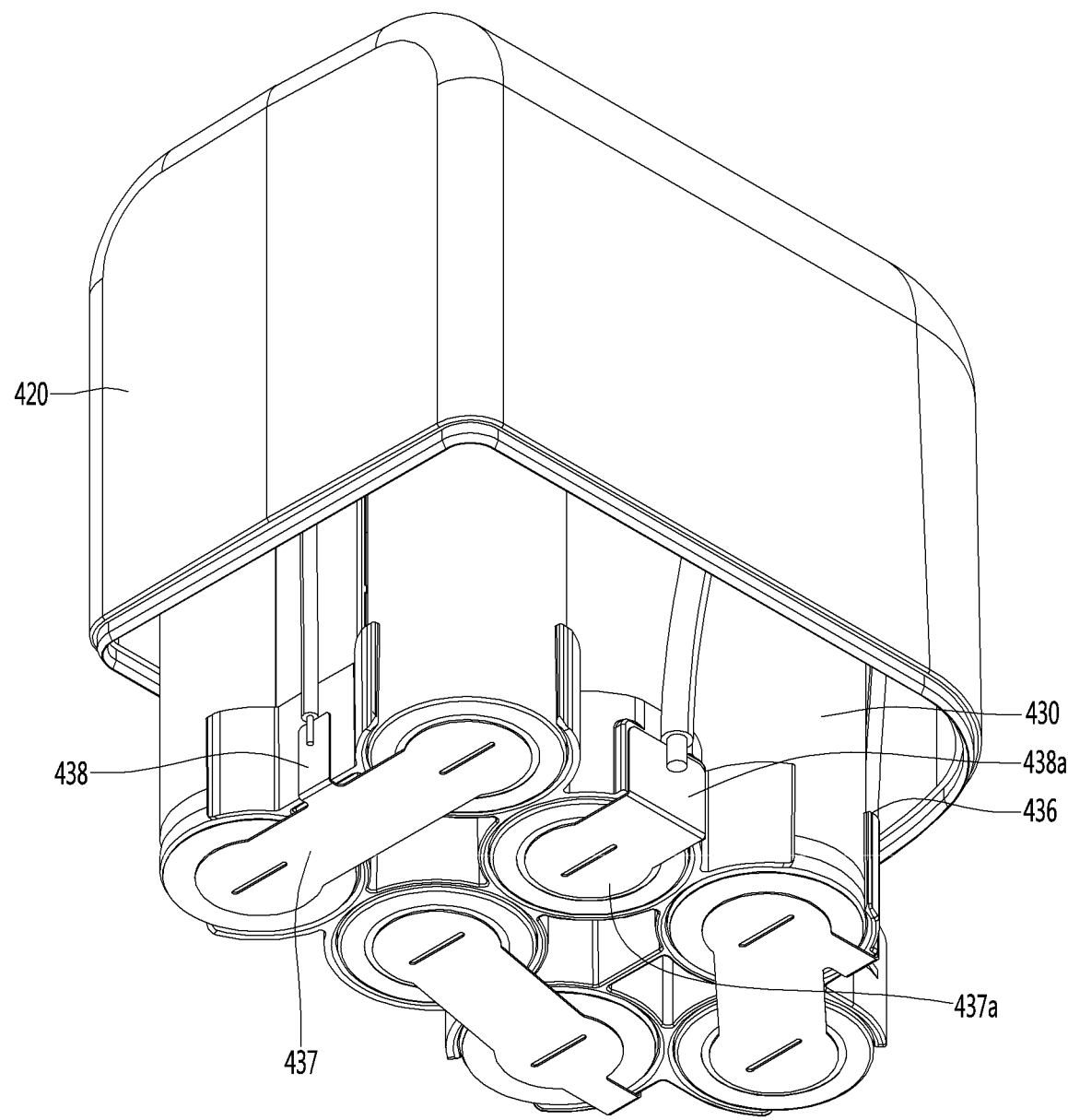
FIG. 20 is a view showing the battery shown in FIG. 9 with a second frame removed.

FIG. 20 is a view showing the battery shown in FIG. 9 with the second frame removed.

Referring to FIGS. 19 and 20, a plurality of first bottom conductors 437 may connect the anodes (+) and the cathodes (−) of two battery cells 430 under the battery cells 430.

For example, since seven battery cells are provided in the present invention, three first bottom conductors 437 may connect the anodes (+) and the cathodes (−) of two battery cells and one second bottom conductor 437*a* may be connected to one electrode (anode (+) or cathode (−)) of one battery cell, under the battery cells.

First bottom conductive plates 438 may be connected to the first bottom conductors 437. For example, the first bottom conductive plats 438 may be integrally formed with the first bottom conductors 437 and may be bent upward from the first bottom conductors 437.

Second bottom conductive plates 438*a* may be connected to the second bottom conductors 437*a*. For example, the second bottom conductive plats 438*a* may be integrally formed with the second bottom conductors 437*a* and may be bent upward from the second bottom conductors 437*a*.

Wires 436 may be connected to the bottom conducive plates 438 and 438*a*. The wires 436 may be connected to the circuit board 481.

The barrier 450 may include wire grooves 456 in which the wires 436 are seated and the circuit board 481 may include wire holes 486 through which the wires 436 pass.

In the present invention, the wire grooves 456 may be referred to as first wire guides and the wire holes 486 may be referred to as second wire guide.

Figure 21:
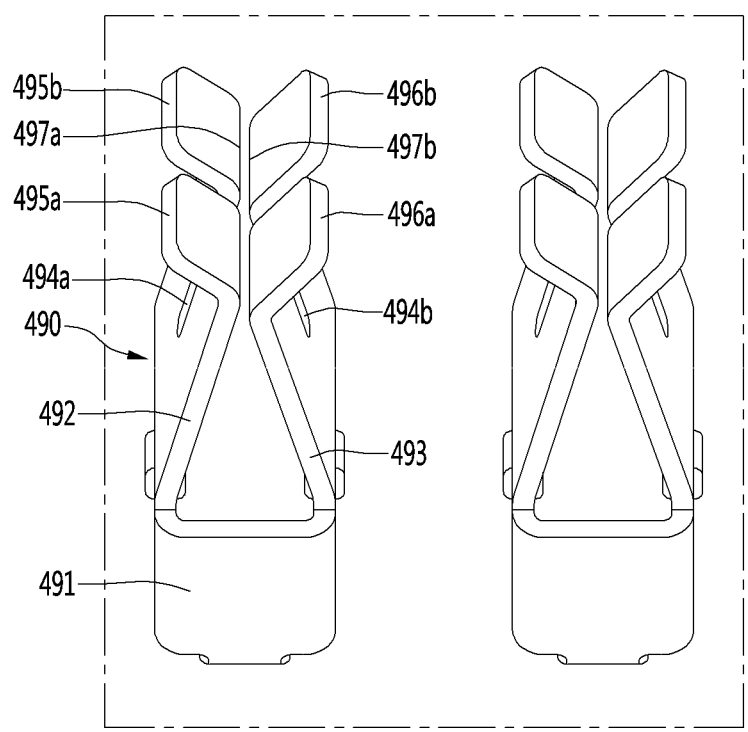
FIG. 21 is a perspective view showing battery terminals according to an embodiment of the present invention.
Figure 22:
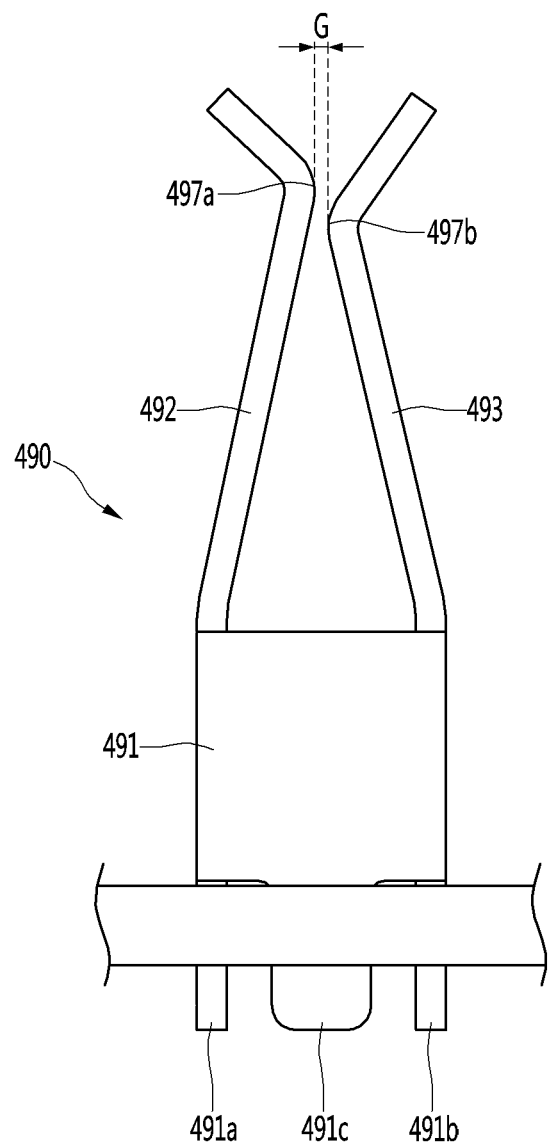
FIG. 22 is a front view of one of the battery terminals of the present invention.

FIG. 21 is a perspective view showing the battery terminals according to an embodiment of the present invention and FIG. 22 is a front view of a battery terminal of the present invention.

Referring to FIGS. 17, 21, and 22, a pair of battery terminals 490 may be directly disposed on the circuit board 481.

The battery terminals 490 may be erected on the circuit board 481. The battery terminals 490 may be partially or fully disposed in the protrusion 422 of the frame 410.

Accordingly, while the battery 40 is vertically inserted into the battery housing 60, the second main body terminals 670 (see FIG. 23) can be coupled to the battery terminals 490.

The battery terminals 490 each may have a base 491 to be installed on the circuit board 481.

The base 491 may include a plurality of installation pins 491a, 491b, and 491c passing through the pin holes 483 of the circuit board 481.

The installation pins 491a, 491b, and 491c may include a first pin 491a and a second pin 491b spaced from each other. The first pin 491a and the second pin 491b may be arranged to face each other.

The installation pins 491a, 491b, and 491c may include a third pin 491c disposed to cross the first pin 491a and the second pin 491b in an area corresponding to the area between the first pin 491a and the second pin 491b.

When the battery terminals 490 are installed on the circuit board 481 and the circuit board 481 is installed over the barrier 450, the anti-deformation rib 453 of the barrier 450 may be positioned in an area between a line connecting the first pin 491a and the second pin 491b, and the third pin 491c Accordingly, it is possible to effectively prevent deformation of the circuit board 481 when the battery terminals 490 and the second main body terminals 670 (see FIG. 23) are combined.

The battery terminals 490 each may have a pair of clip terminals 492 and 493 extending upward from the base 491.

The clip terminals 492 and 493 may include a first clip terminal 492 and a second clip terminal 493.

The first clip terminal 492 and the second clip terminal 493 can be elastically deformed on the base 491 and the second main body terminal 670 (see FIG. 23) are in contact with the first clip terminal 492 and the second clip terminal 493 between the first clip terminal 492 and the second clip terminal 493.

In order for the clip terminals 492 and 493 can be elastically deformed and the second main body terminal 670 (see FIG. 23) is positioned between the clip terminals 492 and 493, the clip terminals 492 and 493 may extend toward each other, as they go upward, and then extend away from each other at a predetermined height.

Accordingly, as the extension directions of the clip terminals 492 and 493 are changed, the clip terminals 492 and 493 may have contact portions 497a and 497b, respectively. That is, the first clip terminal 492 may have a first contact portion 497a and the second clip terminal 493 may have a second contact portion 497b.

In order to improve contact reliability between the contact portions 497a and 497b of the clip terminals 492 and 493 and the second main body terminal 670 (see FIG. 23), a cut portion 494a and 494b for dividing the clip terminals 492 and 493 into a plurality of independent terminals, respectively, may be formed at the clip terminals 492 and 493.

When the cut portions 494a and 494b are formed at the clip terminals 492 and 493 in the present invention, the number of independent terminals of the clip terminals 492 and 493 is increased, so the reliability in contact with the second main body terminal 670 (see FIG. 23) is improved, but the contact area with the second main body terminal 670 (see FIG. 23) is decreased, so a short circuit may occur when a current is high.

Accordingly, the clip terminals 492 and 493 each have two independent terminals 495a, 495b, 496a, and 496b horizontally spaced from each other by the cut portions 494a and 494b, respectively.

The first clip terminal 492 includes a first independent terminal 495a and a second independent terminal 495b and the second clip terminal 403 includes a third independent terminal 496a and a fourth independent terminal 496b.

The independent terminals 495a, 495b, 496a, and 496b have contact portions 497a and 497b, respectively. Accordingly, the clip terminals each have two contact portions 497a and 497b in the present invention.

Figure 23:
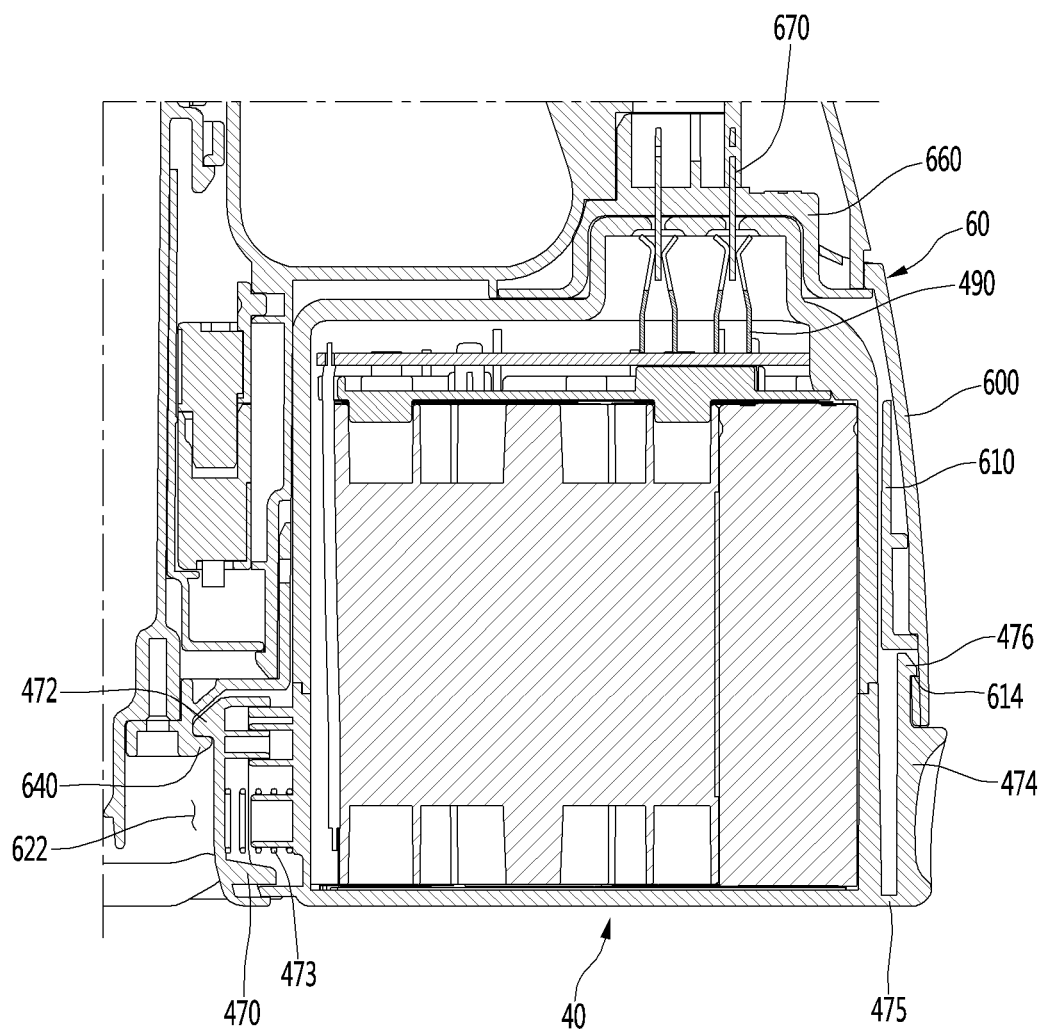
FIG. 23 is a cross-sectional view showing the battery inserted in the battery housing.

In order to improve contact reliability between the contact portions 497a and 497b of the clip terminals 492 and 493 and the second main body terminal 670 (see FIG. 23), the first contact portion 497a of the first clip terminal 492 and the second contact portion 497b of the second clip terminal 493 may be spaced from each other in parallel with the coupling direction of the second main body terminal 670 (see FIG. 23).

That is, the first contact portion 497a and the second contact portion 497b may be arranged not to face each other.

In the present invention, for example, the first contact portion 497a and the second contact portion 497b may be vertically spaced from each other.

The horizontal gap between the first contact portion 497a and the second contact portion 497b is smaller than the thickness of the second main body terminal 670 (see FIG. 23) and the gap may not be provided.

When the gap is not provided, it means that a virtual line connecting the first contact portion 497a and the second contact portion 497b is a vertical line.

Alternatively, the first contact portion 497a and the second contact portion 497b may be arranged to vertically overlap each other.

According to the present invention, even if the battery 40 is frequently inserted in the battery housing 60 and thus the first clip terminal 492 and the second clip terminal 493 are deformed away from each other, whereby the restoring force is reduced, the gap between the first contact portion 497a and the second contact portion 497b can be kept smaller than the thickness of the second main body terminal 670 (see FIG. 23), so the contact reliability can be improved.

Figure 24:
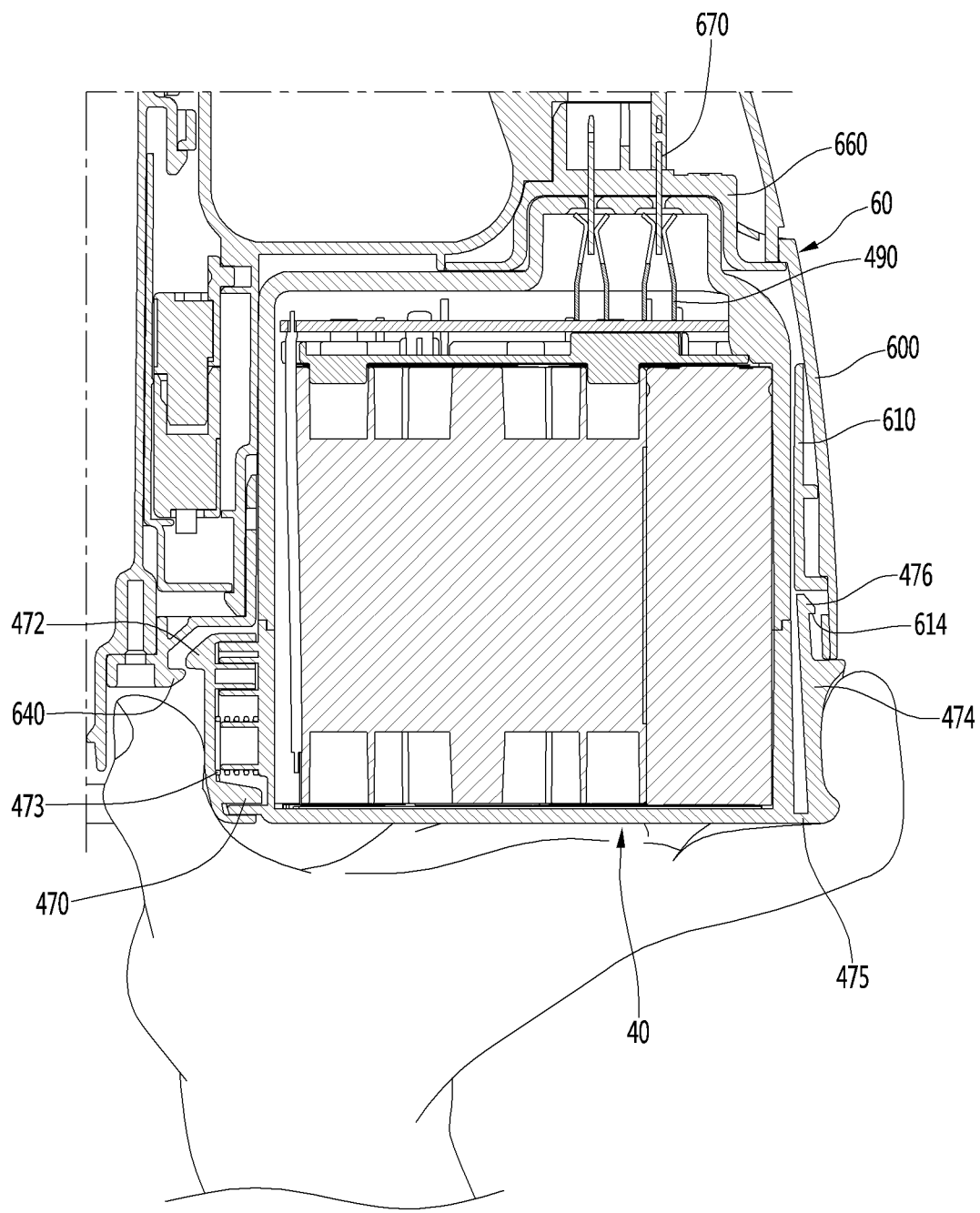
FIG. 24 is a view when a user has operated a first coupling portion and a second coupling portion to separate the battery from the battery housing.

FIG. 23 is a cross-sectional view showing the battery inserted in the battery housing and FIG. 24 is a view when a user has operated a first coupling portion and a second coupling portion to separate the battery from the battery housing.

Referring to FIGS. 23 and 24, the battery housing 60 may have the receiving portion 660 for receiving the protrusion 422. The receiving portion 660 may have second main body terminals 670 for coupling to the battery terminals 490.

In this embodiment, since the second main body terminals 660 are inserted through the terminal holes 424 when the protrusion 422 is inserted into the receiving portion 670, the receiving portion 670 guides the protrusion 422 moving upward so that the second main body terminals 670 can be stably inserted through the terminal holes 424.

In order to separate the battery from the battery housing 60, a user can insert fingers into the space 622 defined between the hinge coupling portions 620.

Further, the user can press the first coupling portion 470 toward the frame 410 with the finger. Accordingly, the elastic member 473 contracts and the first hook 472 of the first coupling portion 470 is unlocked from the locking rib 640.

Further, the user can unlock the second coupling portion 474 from the battery housing 60 by operating the second coupling portion 474 exposed to the outside of the battery housing 60.

In detail, the user presses the second coupling portion 474 toward the frame 410. Accordingly, the second coupling portion 474 is bent toward the frame 410 by the space between the frame 410 and the second coupling portion 474. Therefore, the second hook 476 is pulled out of the coupling slot 614.

As a result, the first coupling portion 470 and the second coupling portion 474 are moved toward each other by a user, whereby they are unlocked.

Accordingly, a user can unlock the first coupling portion 470 and the second coupling portion 474 using two fingers, so the user can easily separate the battery 40 downward from the battery housing 60.

According to the present invention, since the battery 40 can be separated from the battery housing 60, it is possible to place only the battery 40 on the cradle to charge it.

Figure 25:
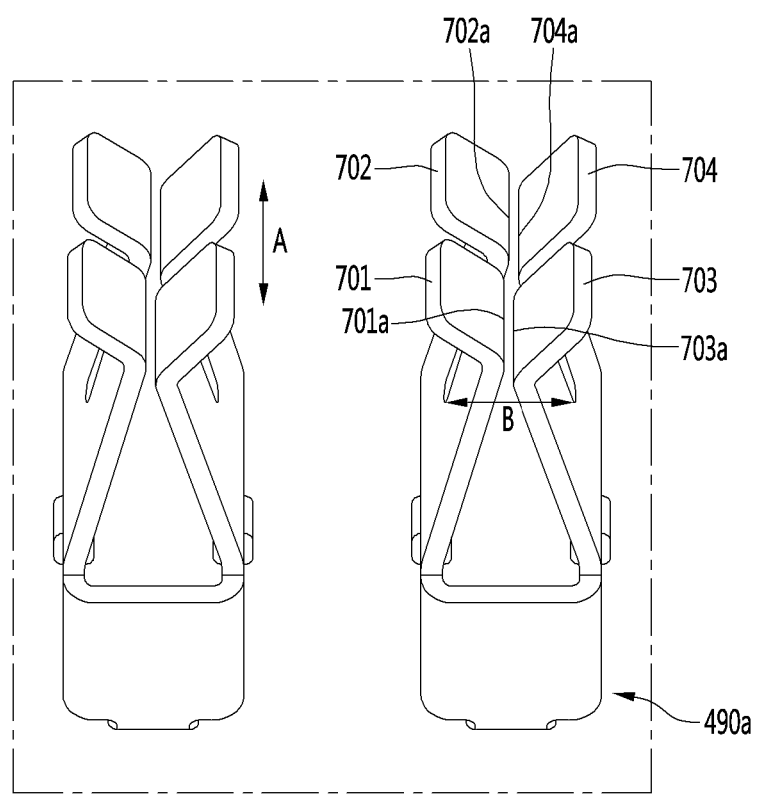
FIG. 25 is a perspective view of battery terminals according to another embodiment of the present invention.

FIG. 25 is a perspective view of battery terminals according to another embodiment of the present invention.

The battery terminals of this embodiment are the same as those shown in FIG. 21, except for the positions of the contact portions of the independent terminals. Accordingly, only characteristic parts of this embodiment are described hereafter.

Referring to FIG. 25, the battery terminals of this embodiment each may have a base 490a and a first clip terminal and a second clip terminal that extend from the base 490a.

The first clip terminal may have a first independent terminal 701 and a second independent terminal 702 and the second clip terminal may have a third independent terminal 703 and a fourth independent terminal 704.

The first independent terminal 701 and the second independent terminal 702 are spaced from each other in a second direction (in the direction of an arrow A) that crosses a first direction in which the battery 40 is inserted into the battery housing 60.

The third independent terminal 703 and the fourth independent terminal 704 are spaced from each other in the second direction.

The first independent terminal 701 may have a first contact portion 701a and the second independent terminal 702 may have a second contact portion 702a positioned at the same height as the first contact portion 701a.

The third independent terminal 703 may have a third contact portion 703a positioned at a different height from the first contact portion 701a and the fourth independent terminal 704 may have a fourth contact portion 704a positioned at the same height as the third contact portion 703a.

The second contact portion 702a may be positioned in an area corresponding to the area between the first contact portion 701a and the third contact portion 703a. The third contact portion 703a may be positioned in an area corresponding to the area between the second contact portion 702a and the fourth contact portion 704a.

The horizontal distance between the first contact portion 701a and the fourth contact portion 704a is set smaller than the thickness of the second main body terminal 670.

Alternatively, the first contact portion 701a and the second contact portion 702a may be spaced from each other in a third direction (the direction of an arrow B) that is the arrangement direction of the first clip terminal and the second clip terminal. Further, the third contact portion 703a and the fourth contact portion 704a may be spaced from each other in the third direction. The third direction crosses the first direction and the second direction.

According to the arrangement of the contact portions, the deformation amount of the second contact portion 702a and the third contact portion 703a is large in the early stage of use after the cleaner is purchased. Further, even if the deformation amount of the second contact portion 702a and the third contact portion 703a is large and the restoring force is reduced, the first contact portion 701a and the fourth contact portion 704a can be stably brought in contact with the second main body terminal.

Figure 26:
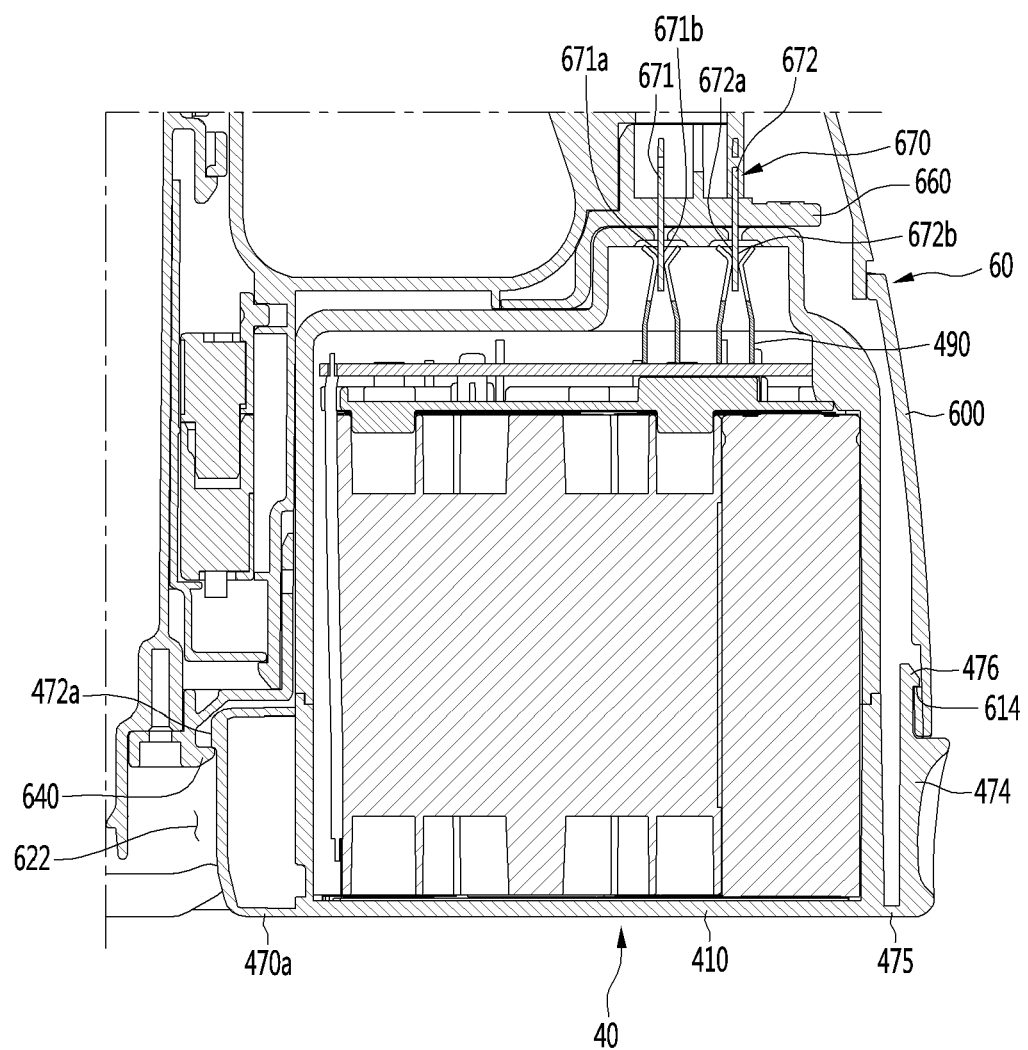
FIG. 26 is a view showing a battery according to another embodiment of the present invention inserted in a battery housing.
Figure 27:
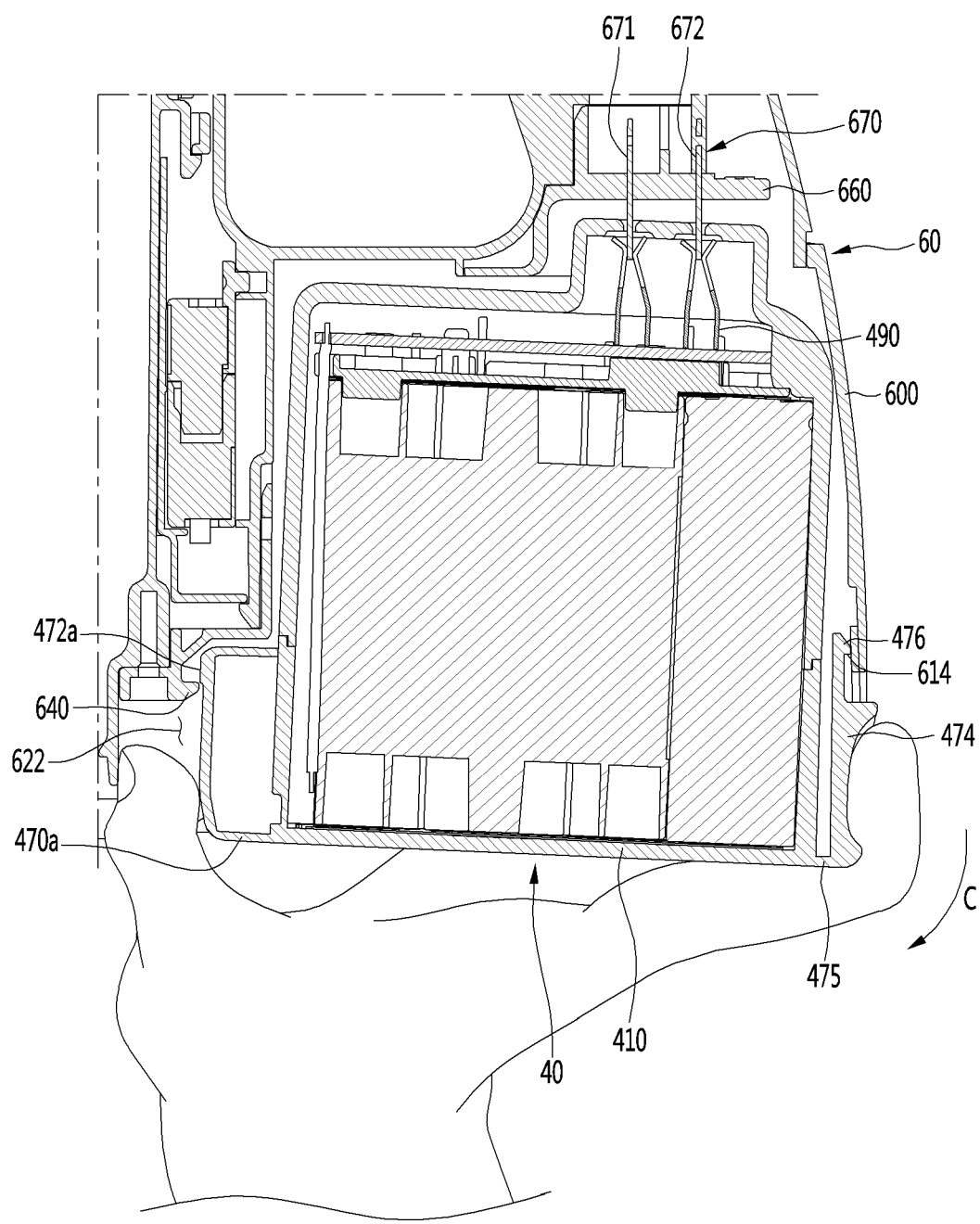
FIG. 27 is a view when the battery is separated from the battery housing in the state shown in FIG. 26.

FIG. 26 is a view showing a battery according to another embodiment of the present invention inserted in a battery housing and FIG. 27 is a view when the battery is separated from the battery housing in the state shown in FIG. 26.

This embodiment is the same as the previous embodiment except the structure and method for mounting and separating the battery. Accordingly, only characteristic parts of this embodiment are described hereafter.

Referring to FIG. 26, the battery 40 may further have a plurality of coupling portions 470a and 474. The coupling portions 470a and 474 may include a first coupling portion 470a disposed on a first side of the frame 410 and a second coupling portion 474 disposed on a second side of the frame 410. The first coupling portion 470a and the second coupling portion 474, for example, may be positioned opposite to each other.

The second coupling portion 474 of this embodiment is the same as that of the first embodiment, so it is not described in detail.

The first coupling portion 470a, unlike the first coupling portion 470 of the first embodiment, is not movably disposed on the frame 410 of the battery 40, but may be fixed to the frame 410. Alternatively, the first coupling portion 470a may be formed integrally with the frame 410. The first coupling portion 470a may have a first hook 472a.

Unlike the previous embodiments, when the battery 40 is inserted into the battery housing 600 without operating the first coupling portion 470a, the first hook 472a of the first coupling portion 470a may be locked to the locking rib 640.

Further, when the battery 40 is separated from the battery housing 600 without operating the first coupling portion 470a, the first hook 472a and the locking rib 640 may be unlocked from each other.

With the battery 40 in the battery housing 600, it is possible to separate the battery 40 from the battery housing 600 by pivoting (or tilting) the battery 40.

For example, when a user pulls out the second hook 476 from the coupling slot 614 by operating the second coupling portion 474, it is possible to pull down and pivot (tilt) the battery in the direction of an arrow C.

Accordingly, the first hook 472a is unlocked from the locking rib 640, so the battery 40 can be separated from the battery housing 600.

In order that the battery 40 is separated from the battery housing 600, the battery terminals 490 should be separated from the second main body terminal 670.

In order that the battery 40 is separated from the battery housing 600 by pivoting, one or more of the battery terminals 490 and the second main body terminal 670 should be elastically deformed.

In the present invention, the battery terminals 490 each have a plurality of clip terminals, as described above with reference to the first embodiment, in order to easily elastically deform the battery terminals 490.

The second main body terminals 670 vertically extend and the clip terminals are horizontally arranged.

The second main body terminals 670 each have a plurality of terminal pins 671 and 672.

The terminal pins 671 and 672 are horizontally spaced from each other. The terminal pins 671 and 672 have a width larger than the thickness. The terminal pins 671 and 672 respectively have contact surfaces 671a, 671b, 672a, and 672b that are in contact with the clip terminals, respectively.

A second contact surface 672b of the first terminal pin 671 and a first contact surface 672a of the second terminal pin 671 are arranged to face each other. According to this arrangement, when a force perpendicular to the contact surfaces 671a, 671b, 672a, and 672b is applied to the terminal pins, the terminal pins can be elastically deformed.

Further, since the clip terminals are horizontally arranged, the clip terminals can be elastically deformed when the battery 40 is separated.

When the battery 40 is pulled down and pivoted in the direction of the arrow C while being separated, one or more of the battery terminals 490 and the second main body terminals 670 can be elastically deformed, and as a result, the second main body terminals 670 can be pulled out of a pair of clip terminals of each of the battery terminals 490. Deformation of the clip terminals is exemplified in FIG. 27.

On the other hand, the method of coupling the battery 40 to the battery housing 600 is the opposite to the method of separating the battery 40 from the battery housing 600, so it is not described in detail.

According to the proposed embodiment, since it is possible to separate the battery from the battery housing, it is possible to independently charge only the battery on a cradle.

Further, since the first contact portions and the second contact portions of the battery terminals that are in contact with the main body terminals are spaced from each other in the direction parallel with the coupling direction of the battery terminals and the main body terminals, reliability in contact with the battery terminals can be improved.

Further, when the battery terminals are disposed on the circuit board of the battery management unit, the circuit board comes in contact with the anti-deformation ribs when the battery is mounted and separated, so deformation of the circuit board can be prevented.

What is claimed is:

1. A cleaner comprising:
   a battery housing;
   a main body terminal that is disposed within the battery housing; and
   a battery that is configured to couple to the battery housing and that is configured to separate from the battery housing, the battery including:
     a plurality of battery cells,
     a frame that receives the battery cells and is configured to be inserted upwardly into the battery housing,
     a battery management unit that is configured to manage voltage of the battery cells, and
     a battery terminal connected to the battery management unit and configured to, based on the battery being inserted into the battery housing, make electrical contact with the main body terminal,
   wherein the battery terminal includes a first clip terminal having a first contact portion and a second clip terminal having a second contact portion, the first and second clip terminals being deformable,
   wherein the main body terminal is configured, based on being inserted between the first and second contact portions, to contact the first and second contact portions,
   wherein the first and second contact portions are staggered along a coupling direction between the battery terminal and the main body terminal, and
   wherein the frame and the battery housing defines a space configured to receive a user's finger inserted between the battery housing and the frame to separate the battery downward from the battery housing.

2. The cleaner of claim 1, wherein the first contact portion and the second contact portion are aligned along a vertical line that is parallel to the coupling direction.

3. The cleaner of claim 1, wherein the first contact portion and the second contact portion overlap each other along the coupling direction between the battery terminal and the main body terminal.

4. The cleaner of claim 1, wherein each of the first and second clip terminals defines a cut portion that partitions each clip terminal into a plurality of independent terminals that are horizontally spaced from each other.

5. The cleaner of claim 1, further comprising a barrier that is coupled to the battery management unit and disposed between the plurality of battery cells and the battery management unit.

6. The cleaner of claim 5, wherein the battery management unit includes a circuit board on which the battery terminal is disposed, and
   wherein the barrier includes:
     a plate that is disposed in parallel with the circuit board, and
     an anti-deformation rib that protrudes from the plate toward the circuit board and that is configured, based on the battery being inserted into and separated from the battery housing, to prevent deformation of the battery management unit.

7. The cleaner of claim 6, wherein the anti-deformation rib is configured, based on the main body terminal being separated from the battery terminal, to contact the circuit board.

8. The cleaner of claim 7, wherein the battery terminal includes a plurality of installation pins passing through the circuit board, and
   wherein the anti-deformation rib is positioned between at least two of the installation pins.

9. The cleaner of claim 6, wherein the anti-deformation rib is configured, based on the main body terminal being separated from the battery terminal, to be spaced apart from the circuit board, and
   wherein the anti-deformation rib is configured, based on the main body terminal being coupled to the battery terminal, to contact the circuit board.

10. The cleaner of claim 9, wherein the battery terminal includes a plurality of installation pins passing through the circuit board, and
    wherein the anti-deformation rib is positioned between at least two of the installation pins.

11. The cleaner of claim 1, wherein the battery housing includes a receiving portion that is configured to receive a protrusion of the frame, and
    wherein the main body terminal is disposed in the receiving portion.

12. The cleaner of claim 1, wherein the battery housing defines a battery chamber configured to receive the battery, the battery chamber having an opening at a bottom portion of the battery housing, and
    wherein the battery is configured to be inserted upward into the battery housing through the opening of the battery chamber.

13. The cleaner of claim 1, wherein the frame includes a first coupling portion and a second coupling portion that are disposed at opposite sides on the battery and configured to couple to the battery housing.

14. The cleaner of claim 1, wherein a bent portion of each of the first and second clip terminals forms the first and second contact portions, respectively.

15. The cleaner of claim 1, wherein the main body terminal includes a plurality of terminal pins protruding from the main body terminal, and wherein the battery terminal is configured to receive the plurality of terminal pins between the first and second contact portions.

16. A cleaner comprising:
a battery housing;
a main body terminal that is disposed within the battery housing; and
a battery that is configured to insert into the battery housing in a first direction, that is configured to couple to the battery housing, and that is configured to separate from the battery housing, the battery including:
a plurality of battery cells,
a frame that receives the battery cells and is configured to be inserted upwardly into the battery housing,
a battery management unit that is configured to manage voltage of the battery cells, and
a battery terminal that is connected to the battery management unit and configured, based on the battery being inserted into the battery housing, to make electrical contact with the main body terminal,
wherein the battery terminal includes:
a first clip terminal partitioned into a first contact portion and a second contact portion that are spaced apart from each other in a second direction transverse to the first direction, and
a second clip terminal partitioned into a third contact portion and a fourth contact portion that are spaced apart from each other in the second direction, the second clip terminal being spaced apart from the first clip terminal in a third direction transverse to the first and second directions,
wherein the first contact portion and the second contact portion are staggered along the third direction,
wherein the third contact portion and the fourth contact portions are staggered along the third direction,
wherein the first contact portion faces the third contact portion, and the second contact portion is located at a position corresponding to an area between the first contact portion and the third contact portion,
wherein the second contact portion faces the fourth contact portion, and the third contact portion is located at a position corresponding to an area between the second contact portion and the fourth contact portion, and
wherein the frame and the battery housing defines a space configured to receive a user's finger inserted between the battery housing and the frame to separate the battery downward from the battery housing.

17. The cleaner of claim 16, wherein the first contact portion is located at a different height relative to the third contact portion, and
wherein the second contact portion is positioned at a different height relative to the fourth contact portion.

18. The cleaner of claim 16, wherein the first contact portion and the third contact portion are aligned along a first vertical line that is parallel with the first direction, and
wherein the second contact portion and the fourth contact portion are aligned along a second vertical line that is parallel with the first direction.

19. The cleaner of claim 16, wherein the first contact portion and the third contact portion overlap each other along the first direction, and
wherein the second contact portion and the fourth contact portion overlap each other along the first direction.

20. The cleaner of claim 16, wherein a horizontal distance in the third direction between the first contact portion and the fourth contact portion is less than a thickness of the main body terminal.

* * * * *